United States Patent [19]

Howard et al.

[11] 4,322,813
[45] Mar. 30, 1982

[54] DATA LOG RETRIEVAL SYSTEM

[75] Inventors: Guy J. Howard; James H. Hubbard, both of Boulder; Walter C. McCrumb, Berthoud; Paul R. Spivey, Longmont, all of Colo.

[73] Assignee: International Business Machines Corporation, Armonk, N.Y.

[21] Appl. No.: 128,686

[22] Filed: Mar. 10, 1980

Related U.S. Application Data

[63] Continuation of Ser. No. 861,761, Dec. 19, 1977, abandoned.

[51] Int. Cl.³ .............................................. G06F 11/30
[52] U.S. Cl. .................................. 364/900; 355/14 C
[58] Field of Search ... 364/200 MS File, 900 MS File; 355/14 C

[56] References Cited

U.S. PATENT DOCUMENTS

| | | | |
|---|---|---|---|
| 4,062,061 | 12/1977 | Batchelor et al. | 364/900 |
| 4,095,094 | 6/1978 | Struger et al. | 364/900 |
| 4,133,477 | 1/1979 | Marino et al. | 364/900 |

Primary Examiner—Gareth D. Shaw
Assistant Examiner—C. T. Bartz
Attorney, Agent, or Firm—Carl M. Wright; H. F. Somermeyer

[57] ABSTRACT

A copy production machine, or other semiautomatic operator-involved machine, logs operations data and error data during normal operations into a nonvolatile store. Logging is categorized for facilitating diagnostics and maintenance of the machine. During a maintenance mode, log scanning methods enable efficient retrieval of the logged data via a keyboard entry system plus manual actuation of other switches used for other purposes during the normal copy production.

2 Claims, 26 Drawing Figures

IMPROVED DATA LOG RETRIEVAL SYSTEM

This is a continuation of application Ser. No. 861,761 filed Dec. 19, 1977, now abandoned.

DOCUMENTS INCORPORATED BY REFERENCE

Commonly Assigned Copending Patent Applications

Ser. No. 729,451, filed Oct. 4, 1976 to David E. Finlay, entitled "Input/Ouput and Diagnostic Arrangements for Programmable Machine Controllers Having Multiprocessor capacities," now issued as U.S. Pat. No. 4,086,658.

Ser. No. 729,453, filed Oct. 4, 1976 to Wallace L. Hubert, entitled "Copy Production Machine Having a Duplex Copy Mode," now issued as U.S. Pat. No. 4,123,155.

U.S. Patents

Irwin No. 3,713,108 shows a digital controller having updatable functions based on prestored microprograms, such as used in certain aspects of the present invention.

Davidge et al. No. 3,989,372 shows a cleaning station adjustment apparatus controllable by the present invention.

U.S. Pat. No. 3,588,242 shows a photoconductor advance apparatus controllable by the present invention.

Printed Publications

Husson, Samir S., MICROPROGRAMMING PRINCIPLES AND PRACTICES, Prentice Hall Inc., Englewood Cliffs, NJ 1970; U.S. Library of Congress number 72-122612.

BACKGROUND OF THE INVENTION

The present invention relates to methods and apparatus for the diagnosis and other analyses of operations of a semiautomatic machine such as a copy production machine of the transfer electrographic type.

A major factor is cost of semiautomatic machines is the maintenance cost. Any procedures and facilities which tend to reduce maintenance time have a salutory effect on cost reduction of machine operation. Many semiautomatic machines having heavy operator involvement in the operation have a multitude of interacting parts and control circuits. Error conditions can be detected by diverse symptoms wherein one symptom can indicate any one of a large plurality of error conditions. In diagnosing such machines for error conditions, including improving adjustment of the various parts of the machine, the history of the machine can be used to advantage. However, the history of the machine, including the error conditions, must be so organized and readily available to facilitate reduced maintenance time.

Semiautomatic machines such as convenience copiers will have attachable features which, if attachable in the field, can reduce total product cost. Such attachable features for convenience copiers are collators, document feeds and the like.

In later model convenience copiers, programmed digital computers have replaced relay control circuits and solid state logic or switching circuits for controlling such machines. Such use of programmed digital computers enables many more functions to be performed, thereby complicating the diagnostics and analyses of machine failures. Generally, such programmed computers operate in accordance with a program of instruction words in a read only store (ROS). Such programs of instruction words relate specifically to one or more portions of the machine being controlled. If a feature is to be added, i.e., a collator is to be added, then such ROS should contain programs applicable to such added collator. If the maintenance personnel were to add or to remove such ROS portions each time a feature is changed, installation time would be increased while the possibility of introducing errors into the machine programming would be high. Accordingly, it is desired to install initially all code that could be used with the machine at the time of manufacture. This statement is true for all features whether or not the features are actually shipped with the machine. After the machine is in its operating site and the feature is to be added, the additional code then can be invoked for controlling that additional feature. Means must be provided for inhibiting operation of the code when the feature is not activated but permitting it when it is.

SUMMARY OF THE INVENTION

A semiautomatic machine constructed with the teachings of the present invention will include a nonvolatile store having a plurality of addressable registers for storing a plurality of parameter signals receivable from a control portion of the machine. Such machine will have a multidigit display, an input keyboard, and a plurality of manually actuable switches for initiating predetermined functions within the machine, including selection of a maintenance mode. The control circuits include means responsive to the selection of the maintenance mode and to actuation of the switches for displaying in the multidigit display contents of registers of the nonvolatile store selected in accordance with keyboard entries. The machine scans for a first nonzero error entry in a group of error entries; each such error group is related to the diagnostics and analysis of the machine. For registers containing operations data, the number of each register will be displayed sequentially in accordance with actuations of predetermined manually controllable switches. Furthermore, access to the nonvolatile store is enabled for allowing keyboard entries to alter the machine characteristics in that as features are physically added to the machine, a control bit in the nonvolatile store is set via the keyboard, as well as limited to operations before preventive maintenance is required. Other control features are controllable via the nonvolatile store.

The foregoing and other objects, features and advantages of the invention will be apparent from the following more particular description of preferred embodiments of the invention, as illustrated in the accompanying drawings.

THE DRAWINGS

DETAILED DESCRIPTION

Figures 1, 3:
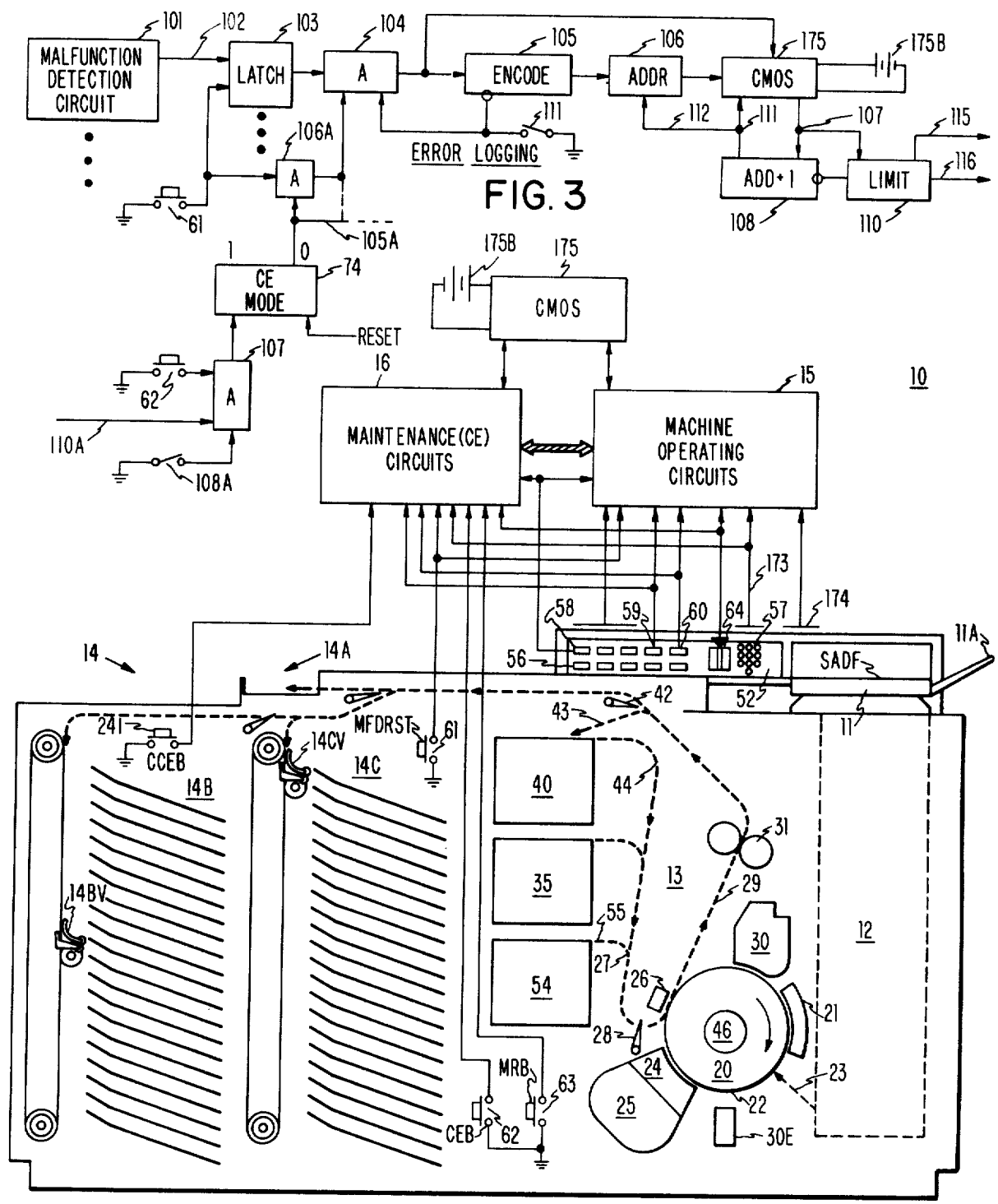
FIG. 1 is a diagram showing incorporation of the present invention into a copy production machine of the convenience copier type.
FIG. 3 is a circuit diagram of an error logging circuit usable as a part of machine operating circuits of the FIG. 1 illustration.

The present invention is described in its preferred form with respect to a copy production machine 10, also referred to as a convenience copier. Machine 10 includes a semiautomatic document feed (SADF) 11 which takes documents manually inserted into tray 11A and places same into an imaging position with respect to original document input optics 12. The image is projected into copy production portion 13, later described, which then supplies produced copies to output portion 14. Output portion 14 includes an output exit tray 14A plus collator portions 14B, 14C. Machine 10 is controlled during normal operations by machine operating circuits 15 and during maintenance procedures by maintenance circuits 16. Circuits 15 operate the machine synchronously using well known techniques. Accordingly, a detailed description of circuits 15 is dispensed with. Maintenance circuits 16 have a close cooperation with the present invention and therefore will be described in some detail. In particular, a nonvolatile store 175 consists of a battery 175B operated CMOS semiconductive memory. Both circuits 15 and 16 access CMOS 175 as will become apparent. Machine 10 is of the semiautomatic type, that is, there is close operator control of copy production. In general, machine 10 is a run-oriented machine in that an operator will select a number of copies to be produced, whether simplex, duplex and so forth, and actuate the machine via a start button. Machine 10 then completes the reproduction run as is well known.

The copy production machine 10 includes an operator's control panel 52 having a plurality of manually actuable switches for introducing copy production parameters to copy production portion 13. Such parameters are well known and are not detailed except for those parameters having an operative and direct relationship with a constructed embodiment of the present invention.

The operation of the copy production portion (CPP) 13 is described in U.S. Pat. No. 4,067,649 (assigned to the same assignee as the present application) from column 3, line 34, to column 4, line 56, where is herein incorporated by reference.

CPP 13 also has second or alternate copy paper supply 54 which supplies copy paper to input path 27 via copy sheet path 55. Selection of paper supply 35 or 54 as a copy paper source is controlled from panel 52 by actuation of switch 56. Selection is mutually exclusive. Machine operating circuits 15 respond to switch 56 to actuate a copy sheet picker (not shown) in the respective copy sheet supplies 35, 54 in a usual manner.

Control panel 52 includes keyboard 57, which permits the operator to insert a series of numbers into machine operating circuits 15 via an input 173. In general, keyboard 57 selects the number of copies to be produced of each image transferred through original input optics 12. An auxiliary control for accommodating light originals is a darker copy button 58. Once the operator parameters have been appropriately selected through panel 52, start button (switch) 59 is depressed resulting in actuating machine operating circuits 15 to operate machine 10 in accordance with the panel 52 selections. In the event the operator desires to stop the machine, stop button (switch) 60 is depressed. In addition, other parameter selection buttons (switches) such as duplex and the like are on panel 52. Since they are not pertinent to an understanding of the present invention, they are not described.

In addition to the control panel 52 switches, some control switches useful for diagnostic purposes are located inside the machine. That is, a panel covering the machine has to be removed for accessing these buttons. A first button which is normally an operator controlled button is misfeed reset button 61. In the event of a copy sheet jam along the paper path, misfeed reset button 61 is actuated for telling the machine operating circuits 15 that the operator has concluded that it is safe to proceed with the next copy production job. Additionally, two buttons actuate circuits for facilitating maintenance and diagnostics of the machine. The first is a customer engineer button (CEB) 62 which places the machine 10 into a CE mode wherein maintenance circuits 16 have the ultimate control over machine 10. During the CE mode, the machine normally does not produce copies. In the event copies are desired to be produced for assistance in diagnostics, then the momentary run button (MRB) 63 is actuated by maintenance personnel.

In accordance with the present invention, the just described manually actuated buttons, including keyboard 57 and digital display 64, provide interactions among the operating personnel, maintenance circuits 16, operating circuits 15, and the remainder of machine 10, in particular CMOS 175, for facilitating diagnostics and maintenance of machine 10. In the CE mode, the entries into keyboard 57 alter the interpretation of the various operator actuated buttons on panel 52 as well as select subdivisions of the maintenance procedures as will become apparent.

Figure 2:
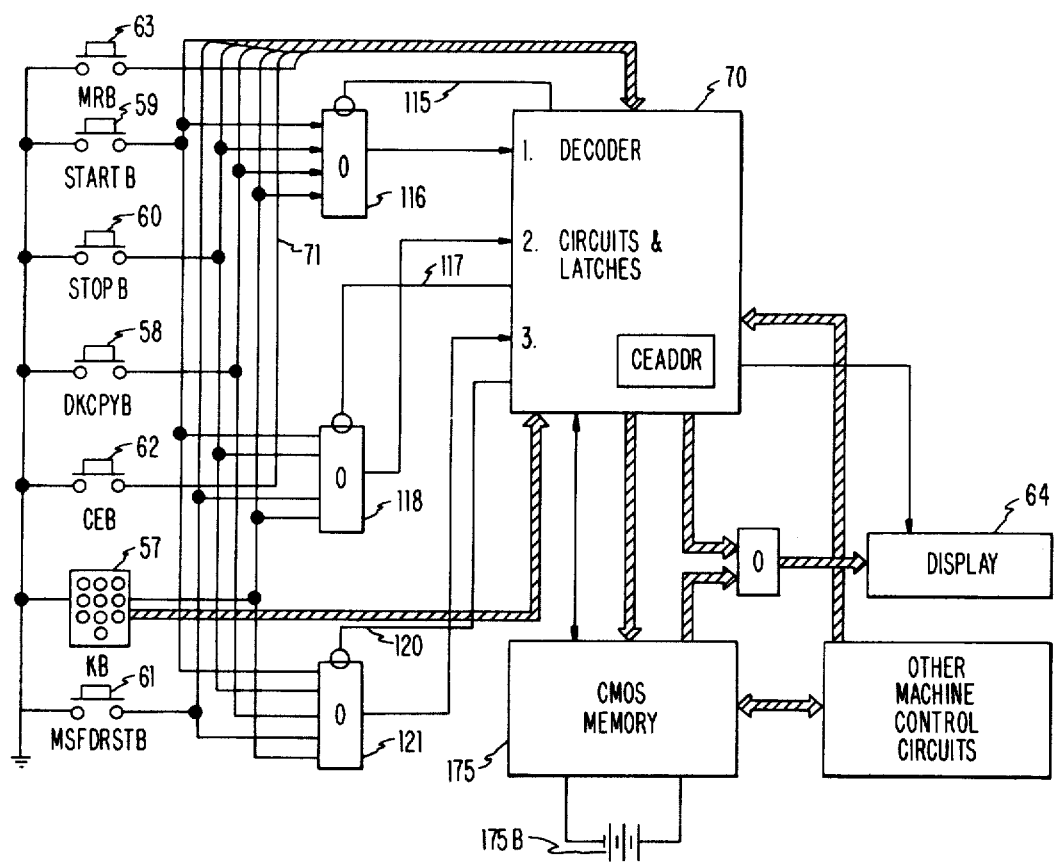
FIG. 2 is a block diagram of some maintenance circuits usable with the machine illustrated in FIG. 1.
Figure 6:
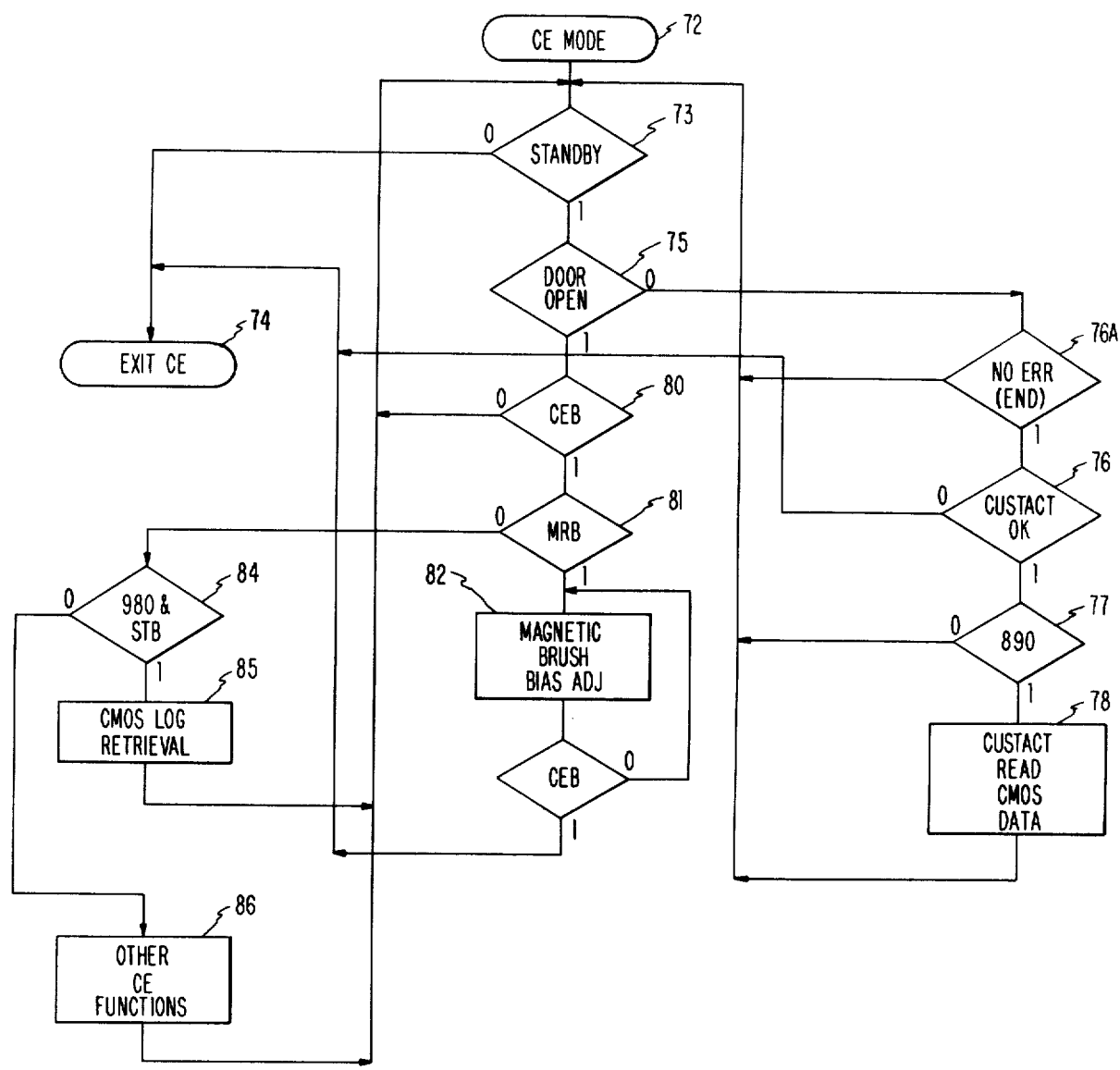
FIG. 6 is a flow chart illustrating interaction of a control panel and a nonvolatile store for retrieving stored data as well as initiating adjustments of the machine being controlled.

FIG. 2 shows a portion of maintenance circuits 16 to provide an understanding of the present invention. The operator inputs are shown along the left including keyboard 57 through MRB 63. CEB 62 is connected to a set of decoder circuits and latches 70 via a line 71 for actuating the circuits to the CE mode. Once the CE mode is established, the sequence of operation of decoder 70 as shown in FIG. 6 is executed. That is, the FIG. 6 flow chart represents the electronic circuits of decoder 70 that operate in a monitoring or supervisory mode. The flow chart also represents the steps maintenance personnel must perform in order to effect predetermined specific maintenance procedures, as will become apparent. The CE mode is memorized by a latch 74 (FIG. 3) at step 72 (FIG. 6). For the CE mode to be active, machine 10 must not be producing copies as indicated by the standby decision element 73. If machine 10 is active, then the CE mode is reset (exit) at 72. When the standby mode is active, the decoder 70 determines whether or not any of the aforementioned maintenance access doors (not shown) are open. If such doors are not open, even though a paper supply access door is open, then, after determining an error-free condition at 76A, the circuits 70 check at 76 to see whether or not user access (CUSTACT) to nonvolatile store 175 is authorized. This authorization indication can be a bit position within nonvolatile store 175 or a switch setting (not shown) within decoder 70. In the event the user is not authorized access, the CE mode is reset at 74. An error-free condition is indicated by the "ENP" bit position (not shown) in machine operating circuits 15. Upon detecting authorization, the decoder then examines the input from keyboard 57. If the operator had inserted a number 980 into keyboard 57, then a customer reading mode for CMOS 175 is set up at 78. On the other hand, if at step 77, 980 was not sensed from keyboard 57, decoder 70 returns to step 73.

With the doors open at step 75, decoder 70 must determine whether or not the CE mode is to be entered. CEB 62 is sensed at 80. If it is not depressed, step 73 is repeated. In this regard, the CE mode is exited whenever the operator pushes CEB 62 a second time, i.e., CE mode latch 74 is of the toggling type as seen in FIG. 3. It is to be understood that other controls (not shown) maintain machine 10 in a condition for being maintained and analyzed as hereinafter described, i.e., machine 10 will not be started until after controls (not shown) not pertinent to this invention are invoked.

Assume CEB 62 is actuated at step 80, then decoder 70 senses at 81 for MRB 63. If MRB 63 is actuated, then a maintenance adjustment mode is entered at 82 for adjusting the magnetic brush bias of developer station 24. As long as CEB 62 is not again actuated, adjustment procedures are permitted. Upon actuating CEB 62 during adjustment 82, the CE mode is exited at 74.

If, on the other hand, MRB 63 was not actuated at 81, then decoder 70 senses the keyboard 57 input for 980 code. If the 980 code has been entered and start button 59 has been actuated at 84, then the maintenance log retrieval mode is entered at 85. This mode will be described later with respect to FIG. 7. If, on the other hand, the AND circuit conditions at 84 were not satisfied, other CE functions not pertinent to the present invention are enabled at 86. From such functions, step 73 is again performed. Also, a second actuation of CEB 62 deactivates the CE mode at any time.

The above-described flow chart represents a scanning operation wherein a clock (not shown) scans a plurality of latches or flip-flops (not shown) respectively enabling AND circuits (not shown) for performing the functions set forth in FIG. 6. For ease of understanding, the flow chart approach was chosen over the detailed hardware approach. A more complex computer control version of this flow chart is detailed later. In this regard, CMOS log retrieval steps 85, other CE functions 86, and read CMOS data 78 each are substantial operations which will be later described in detail.

Before proceeding further with a description of log retrieval and the associated interaction between panel 52 and the circuits illustrated in FIG. 2, the structure and generation of the logs to be retrieved are described. Nonvolatile store 175 contains three types of recorded indicia. A first type is a set of logs (data entries) relating to operation data as supplied by machine operating circuits 15. A second type is error data also supplied by machine operating circuits 15. The error data has two types of data, one type is operation error data and the second is a machine error failure data. Each of these two broad classes are further subdivided in accordance with the various operational portions of the machine 10, such as SADF 11, original input optics 12, CPP 13, and output portion 14. Finally, nonvolatile store 175 contains authorization indicia enabling machine operating circuits 15 to operate machine 10 in certain modes only if authorization bits have been inserted into nonvolatile store 175. Some of these authorization bits are designed to alter the operation of the machine 10 in accordance with the location of the machine in the world, i.e., different nations have different requirements such as copy sheet size variations. Machine operating circuits 15 must be able to operate machine 10 in these various diverse locations. Furthermore, extra cost features such as collators 14B, 14C can be added. Therefore, nonvolatile store 175 contains bit positions for indicating which features are in machine 10. In this way, machine operating circuits 15 more precisely control machine 10 with respect to such added features.

Figure 5:
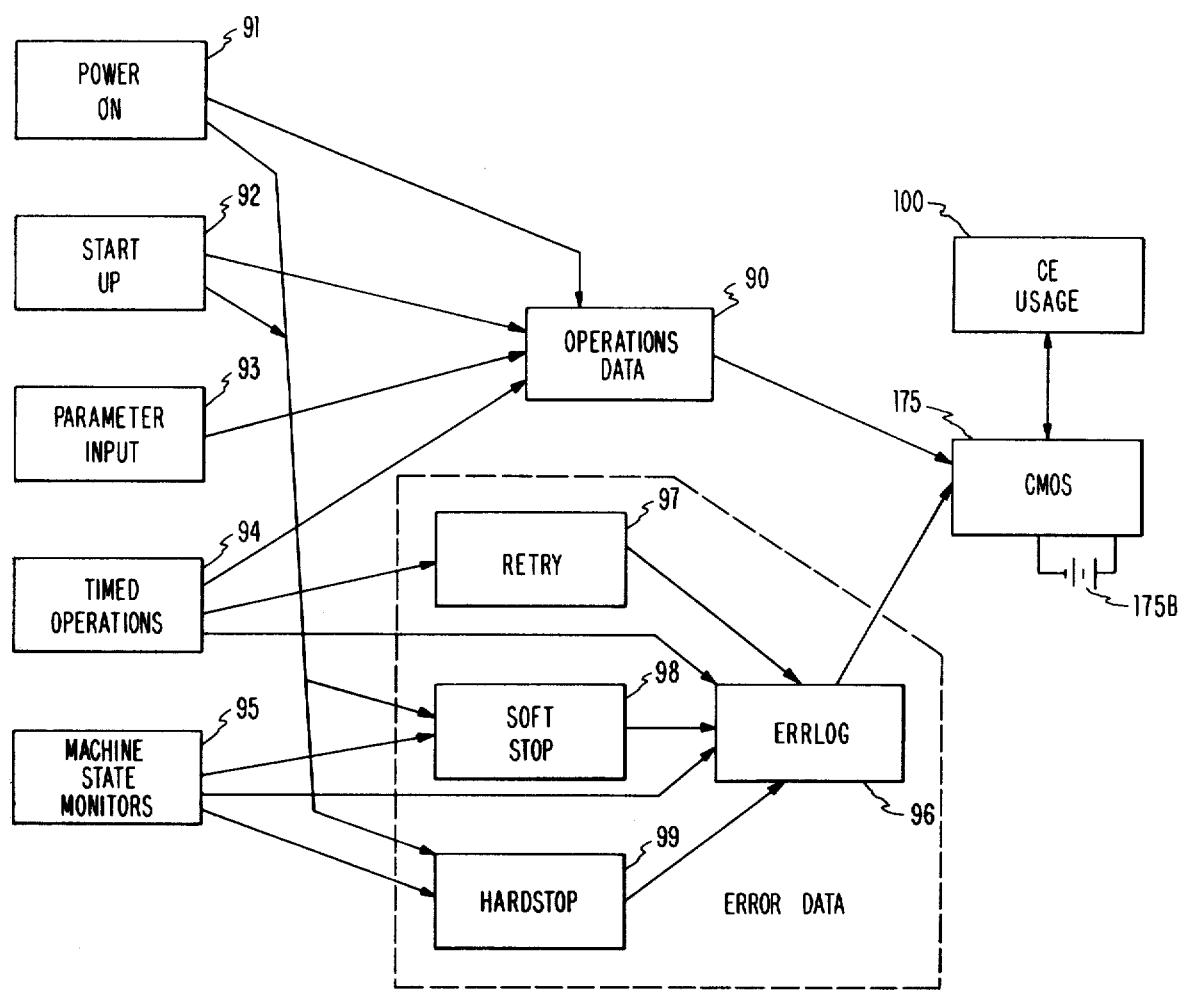
FIG. 5 is a diagram illustrating data flow with respect to the nonvolatile store in a manner which illustrates stored signal organization of the nonvolatile store for enhancing maintenance and diagnostic procedures.

The operations data is garnered from control panel 52, SADF 11, collators 14B, 14C, and CPP 13. As seen in FIG. 5, the logged data flow for operations data at 90 comes from machine 10 having power on 91, start up for each run at 92, panel 52 operator parameter inputs 93, and from CPP 13 timed operations at 94. All of these inputs are supplied to nonvolatile store 175 as operations data 90 by machine operating circuits 15. Table I below indicates the data fields in operations data 90 together with the keyboard (KB) code to be inserted in keyboard 57 for fetching the indicated data field during mode 85 of FIG. 6.

TABLE I

| | OPERATIONS DATA |
|---|---|
| KB CODE | DATA FIELD |
| 850 | Number of Originals Fed Through SADF 11 |
| 852 | Number of Originals Placed on Document Glass |
| 854 | Number of Originals Duplexed |
| 856 | Number of Originals Reduced |
| 858 | Number of Originals Collated |
| 860 | Number of Originals Using Supply 54 |
| 862 | Number of Separation Mode Runs |
| 864 | Total Number of Collated Copies |
| 866 | Total Number of Reduced Copies |
| 868 | Total Number of Copies in Run Lengths 1-5 |
| 870 | Total Number of Copies in Run Lengths 6-10 |
| 872 | Total Number of Copies in Run Lengths 11-20 |
| 874 | Total Number of Copies in Run Lengths 21-40 |
| 876 | Total Number of Copies in Run Lengths 41+ |

SADF 11 has a pivoted lid (not shown) for enabling the operator to feed semiautomatically documents through SADF 11 or to place manually originals directly on a document glass (not shown) over which SADF 11 transports documents to be copied. In addition, the number of originals reproduced during a duplex mode or reduced with copies collated is also indicated. Copy sheet supply 54 is termed an alternate copy sheet supply; and the number of times it is selected is logged. Furthermore, the machine 10 can automatically insert separator sheets between successive jobs so the number of separation mode runs are tallied. Finally, the total number of copies collated or reduced and various run lengths are tallied. In addition to all of the data fields mentioned above, a separate billing meter (not shown) is used in the machine for tallying the total number of copies produced. With regard to fields 868-876, each tally represents the total number of copies produced in the respective run lengths.

The error data is received from diverse sources including machine state monitors 95. Such monitors include, for example, a fuser temperature sensor. The error data are assembled into an error log at 96 and then recorded in the nonvolatile store 175. The character of the error log will include machine retries from 97, soft stops at 98, and hard stops at 99. A machine retry occurs when an intermittent error condition is accommodated by trying an operation twice, rather than once, before stopping copy production machine 10 for the error condition. A hard stop is an error condition in the xerographic process CPP 13 which requires the machine 10 to stop immediately. A soft stop allows certain functions to continue as is well known in the arts. The error data from the diverse sources is divided into two categories, operational error logs and machine state error logs. Table II below shows the operational error log in one embodiment of the invention.

TABLE II

| OPERATIONAL ERROR LOG | |
|---|---|
| SCAN GROUP | COPY SHEET PATH ERROR |
| 110 | Aligner 28 Slow Misfeed |
| | 111 Primary Selected |
| | 112 Alternate Selected |
| | 113 Duplex Selected |
| 120 | Aligner 28 Late Misfeed |
| | 121 Primary Selected |
| | 122 Alternate Selected |
| | 123 Duplex Selected |
| 130 | Aligner Misfeed (Retry Successful) |
| | 131 Primary Selected |
| | 132 Alternate Selected |
| | 133 Duplex Selected |
| 140 | Aligner Misfeed (Retry Unsuccessful) |
| | 141 Primary Selected |
| | 142 Alternate Selected |
| | 143 Duplex Selected |
| 150 | Detach Misfeed |
| | 151 Primary Selected |
| | 152 Alternate Selected |
| | 153 Duplex Selected |
| | 154 Vacuum Plenum Failure |
| 160 | Paper On Drum |
| | 161 Primary Selected |
| | 162 Alternate Selected |
| | 163 Duplex Selected |
| 170 | Fuser Misfeed |
| | 171 Primary Selected |
| | 172 Alternate Selected |
| | 173 Duplex Selected |
| 180 | Exit Misfeed |
| | 181 Simplex Arrival Failure |
| | 182 Simplex Leaving Late |
| | 183 Duplex Side 1 Arrival Failure |
| | 184 Duplex Side 1 Leaving Late |
| ORIGINAL IMAGE HANDLING | |
| 710 | SADF |
| | 711 Entry |
| | 712 Exit |
| 730 | Reduction |
| | 731 Last Failure |
| COLLATOR | |
| 740 | 741 Collator Aligner Arrival |
| | 742 Collator Aligner Leaving |
| | 743 Path Arrival Simplex |
| | 744 Path Leaving |
| | 745 Path Arrival Duplex |
| | 746 Excess Copies in Path |
| | 747 Copy Left in Path |
| | 748 Vane 1 Home Failure |
| | 749 Index Down 1 Failure |
| 750 | 751 Index Up 1 Failure |
| | 752 Door 1 Open |
| | 753 Path 2 Arrival Simplex |
| | 754 Path 2 Leaving |
| | 755 Path 2 Arrival Duplex |
| | 756 Vane 2 Home Failure |
| | 757 Index Down 2 Failure |
| | 758 Index Up 2 Failure |
| | 759 Door 2 Open |

Inspection of Table II above shows that each critical operation of machine 10 is included in the operations error log. For example, in group 120 the aligner 28, which is the input aligner to the transfer station 26, may receive copy sheets too late to produce a good copy. Accordingly, the error log will include which source of copy sheets was associated with the misfeed condition. In group 110, the copy sheet arrived late (slow) at aligner gate 28, but was in time to make a successful copy producing run. The other categories are self-explanatory.

In Table III below, certain machine errors are listed. For example, the machine 10 may be constructed for safety purposes to stop operations if a door is open. Therefore, at category 71 any time a door is opened, an error is logged. The other types of errors listed in Table III are self-explanatory.

TABLE III
MACHINE ERRORS

| SCAN GROUP | MACHINE ERRORS |
|---|---|
| 70 | Miscellaneous |
|  | 71 Door Open While Running |
|  | 72 CMOS Memory Fail |
|  | 73 Fuser Undertemperature |
|  | 74 No 16 Emits Between Syncs |
|  | 75 Select Paper Length Error |
| 50 | Copier-1 |
|  | 51 Memory Fail |
|  | 52 No Crossovers |
|  | 53 LED Check Circuit |
|  | 54 Fuser Overtemperature |
|  | 55 Optics Overtemperature |
| 60 | Copier-2 |
|  | 61 Corona Overcurrent |
|  | 62 Emit with No Start |
|  | 63 Start with No Emit |
|  | 64 Toner Feed Mechanism |
|  | 65 Reduction |
| 210 | Photoconductor Advance Failures |
|  | 211 Always Inactive |
|  | 212 Inactive Then Active |
|  | 213 Always Active |
|  | 214 Active Then Inactive |

This describes the character of errors being logged and their classification. The error logging circuit of FIG. 3 is an exemplary circuit within machine operating circuits 15 for logging errors listed in Tables II and III. A malfunction detection circuit 101, e.g, the copy sheet jam detection, supplies an error signal over line 102 for setting a corresponding error latch 103 to the active condition for memorizing and indicating a detected error condition. There is one of the circuits 101, 102, 103 for each of the errors listed in Tables II and III.

When the operator has cleared the error condition, misfeed reset button 61 is actuated to enable restarting machine 10. At this time, a signal is transferred from switch 61 resetting all of the latches 103 and simultaneously enabling the output AND gates 104 to transferring the latched error condition to an encoder 105.

Encoder 105 has a plurality of inputs, one from each of the malfunction detection circuits 101, 102, 103, 104. Depending on which input is actuated, the encoder 105 supplies an encoded signal corresponding to the scan group of Tables II and III, i.e., generates an address for nonvolatile store 175. If a plurality of inputs occur, only one is selected at a time, using predetermined priority or tie-breaker circuits (not shown). The encoder generated address is supplied by encoder 105 to address circuits 106, operatively associated with CMOS 175. The addressing circuits 106, receiving the address, fetch the corresponding log from nonvolatile store 175 and supply it over a line 107 to a +1 add circuit 108 and to a limit circuit 110. The +1 add circuit 108 adds one to the fetched contents and returns same to nonvolatile store 175 over lines 111 as well as to addressing circuits 106 over line 112. The signal on line 112 actuates addressing circuits 106 to record the incremented value in nonvolatile store 175 at the same address corresponding to the scan groups of Tables II and III. Since each register in nonvolatile store 175 has a fixed modulus, limit circuit 110 ensures that the modulus is not exceeded, i.e., the error count does not go to all zeros. When a limit is reached, which can be a predetermined value for each of the error conditions, add circuit 108 is inhibited with the fetched value being returned to nonvolatile store 175 for maintaining the previous error count. The circuitry 105-112 of FIG. 3 can also be used for incrementing counts relating to use of components within machine 10. For example, cleaning station 30 has a rotary brush which wears with usage. Since the cleaning station brush may also be used for impelling air into the cleaner station for entraining the toner particles within the station, nonvolatile store 175 has a count field indicating the number of cycles executed by the cleaning station 30 brush since its last adjustment. When the limit circuit 110 detects the limit of the number of cycles for each brush adjustment, it sends a signal over line 115 to appropriate brush advancing circuits in machine operating circuits 15 for advancing the cleaner brush toward photoconductor drum 20. Actuation of such a cleaning brush is shown in U.S. Pat. No. 3,989,372. Similarly, photoconductor drum 20 may be constructed as shown in U.S. Pat. Nos. 3,588,242 and 4,036,556 requiring a photoconductor medium advance after a certain number of machine cycles. The number of cycles for the photoconductor advance may be different from that required for the cleaning brush advance. Accordingly, a separate circuit and a separate limit is set in limit circuit 110 for photoconductor advance. A signal on another line 116 signals machine operating circuits 15 to advance the photoconductor as shown in said patents 3,588,242 and 4,036,556.

CE mode latch 74 also supplies its CE mode indicating signal over line 105A to other circuits, later described. AND circuit 106A is enabled by the line 105A signal to pass the misfeed reset signal received from switch 61. CE mode latch 74 is set to the active condition and reset to the inactive condition by successive actuations of CEB 62. AND circuit 107 is enabled by interlock switch 108A being closed when the doors (not shown) of copy production machine 10 are open and by the standby mode signal received from machine operating circuits 15 over line 110A.

It may be desired not to log all data for all machines. An encode 105 enable switch 111 enables encode 105 plus the appropriate AND circuit 104 when the designated data is to be logged. In a preferred form, each class of data is enabled to be logged. In a computerized embodiment, logging authorization or enablement is a set of bits in CMOS 175 which enable program controlled logging.

CMOS nonvolatile store 175 now contains all of the various logs of data in preparation for maintenance procedures to be described. Such maintenance procedures are indicated in FIG. 5 by numeral 100 as CE usage of the data accumulated in CMOS 175 from the previously indicated diverse sources. Utilization of CMOS 175 is explained with respect to FIGS. 2 and 4. In a first mode, operations data set forth in Table I is fetched from CMOS 175. Such mode is set up within circuit 70 and indicated by a suitable signal supplied over line 115. The line 115 signal enables OR circuit 116 to pass signals from the start button 59, stop button 60, dark copy button 58, and keyboard 57 to address the operations log in accordance with address or code information introduced through keyboard 57. Since this is a straight addressing function, details of the circuitry are not described. The procedures described with respect to the FIG. 7 flow chart are sufficient to show the type of operation involved.

The error log scanning looks for nonzero entries and displays the error class code symbols of Tables II and III whenever a nonzero entry is found. Then, upon a further action by a maintenance person, the values contained in the register, i.e., the number of errors logged up to a predetermined maximum, are displayed. The error mode is indicated by decoder circuit 70 supplying a signal over line 117 for enabling an OR circuit 118 to pass signals from the start button 59, stop button 60, misfeed rest button 61, and keyboard 57. The operation illustrated in FIG. 2 is detailed in FIG. 4 with the functions described with respect to FIG. 7.

Figure 4:
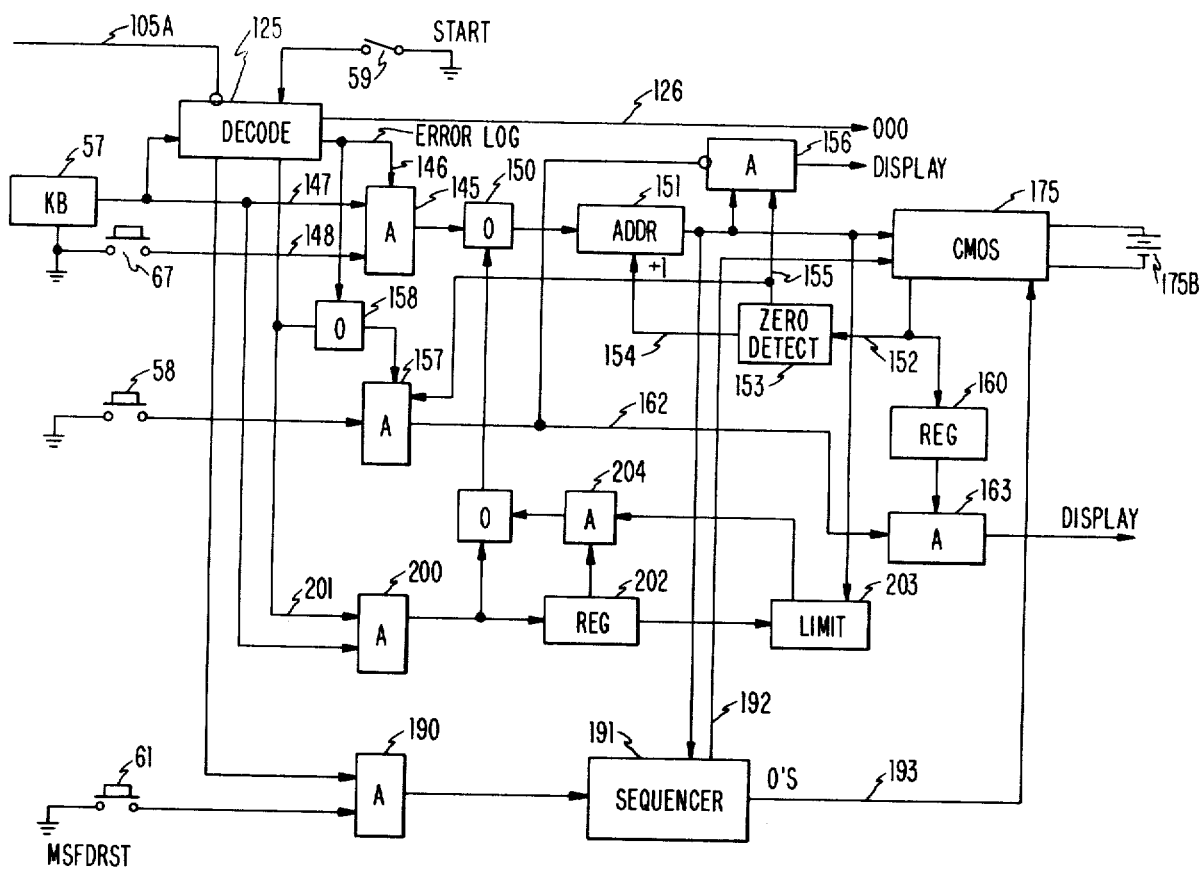
FIG. 4 is a circuit illustrating controlled access to a nonvolatile store in the embodiment illustrated in FIG. 1.

Adjusting the limits of certain count fields with CMOS 175 that relate to the photoconductor advance and the adjustment of the cleaning brush is indicated by a controlling signal from decoder 70 supplied over line 120 for enabling OR circuit 121 to pass the start button signal, stop button signal, dark copy button signal, misfeed reset button signal, and keyboard 57 signals to decoder circuits 70. FIG. 4 illustrates an example of adjusting the limits using procedures set forth with respect to FIG. 7.

Figure 7:
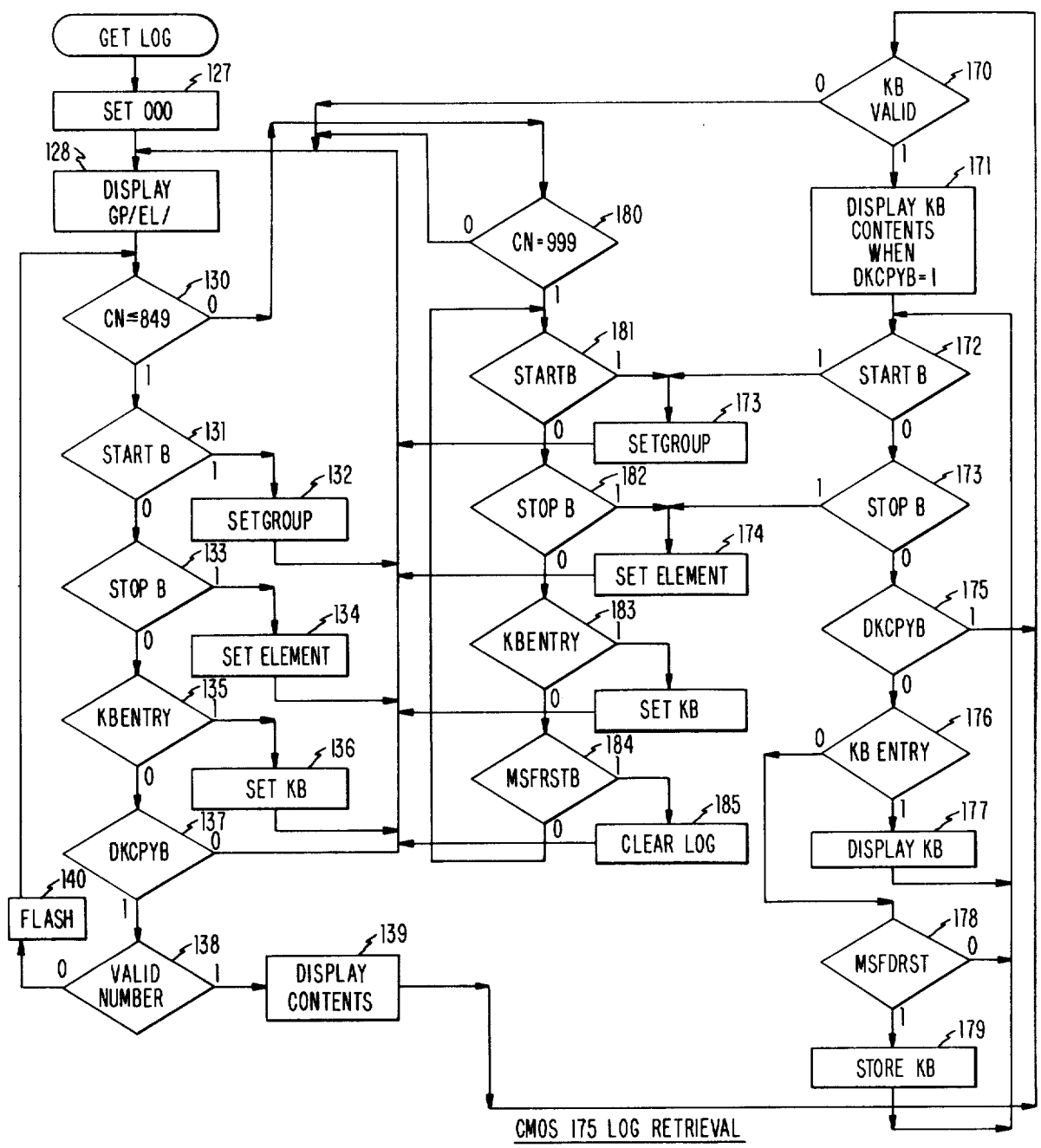
FIG. 7 is a flow chart illustrating interaction between a control panel and a nonvolatile store for retrieving data of the operations type.

A log retrieval mode is entered by entering the digit code 980 through keyboard 57 immediately after setting up the CE mode by actuating the CE switch 62 once and then actuating start button 59. A decode 125 interprets the input code 980 as a log retrieval mode. Decode supplies a 000 indicia over line 126 to three-digit display 64 and is indicated in FIG. 7 as step 127. The start button 59 actuation initiates a scan looking for a nonzero group within the log, subsequent actuations of start button 59 actuating the control to display the next group with a nonzero value. When the end of the scan of the error log is reached at 849, an additional actuation of start button 59 causes all zeros to be displayed again. This is shown in FIG. 7 by the display symbol 128 initially displaying all zeros, checking for the value 849 at 130 and the start button at 131. Start button being checked causes a group to be set, i.e., an address advance for CMOS 175 as at 132. If an element within a group is to be displayed, the start button 59 is not actuated; instead, the stop button 60 is actuated at 133 which results in an element address to be set at 134. If there is another keyboard entry from keyboard 57 such as at 135, that entry is set at 136. The darker copy button 58 is checked at 137 for entering in the new keyboard entry. If the number is valid at 138, i.e., one of the codes listed in Tables I, II, or III, the contents of the code addressed register are displayed at 139. Otherwise, the number entered is displayed and flashed at 140 with the scan of the various buttons at 130, 131, 133, 135 and 137 being repeated until one of them is actuated.

In FIG. 4, AND circuit 145 responds to decode 125 error log signal on line 146, keyboard 57 entry received over lines 147, and the stop button 60 actuation as received over line 148 to supply an actuating signal through OR circuit 150 to address register 151. When the address register receives an address signal via keyboard 57, it supplies it for addressing a register within CMOS 175. CMOS 175 responds to the address signal to supply the contents of the addressed register over lines 152 to zero detector 153. If a zero is detected, the address register 151 is incremented by a signal supplied over line 154 by detector 153 (scan continues). If a zero is not detected, i.e., the contents of the address CMOS 175 register is nonzero, then an actuating signal is supplied over line 155 to actuate AND circuit 156 to pass the contents of address register 151 to display 64. That is, the group being addressed which is nonzero is now displayed in display 64. The line 155 signal indicating a nonzero detection also travels to AND circuit 157 which enables display of the numerical contents of the register just read from CMOS 175 and as stored in register 160. AND circuits 156 will continue to display the contents of address register 151 as long as no further operator action is taken. Actuation of dark copy button 58 supplies a signal to AND circuit 157 which is enabled from decode 125 via OR circuit 158 and the line 155 to supply an actuating signal over line 162 to AND circuits 163 for passing the contents of register 160 to display 64. Simultaneously, the line 162 signal deactuates AND circuits 156 for removing the address display from display 64. As long as the dark copy button 58 is actuated, the display will indicate the contents of that register in CMOS 175. A latch (not shown) can be added to the circuits for memorizing that display.

In FIG. 7, the actuation of the darker copy button 58 enabled the display of the contents of the register addressed by keyboard 57 entry from step 139. The validity of the keyboard entry is validated at 170. If it is invalid, then the step 128 is entered. If the keyboard entry actually was a valid actuation, then the keyboard entry is displayed at 171 as long as the darker copy button 58 is actuated. Following this procedure, the start button is sensed at 172. If it is actuated, a new group is set at 173 and step 128 is repeated for displaying the group as previously described. If the start button is not actuated, then the stop button is sensed for at 173. If it is actuated, an element is set at 174 and step 128 repeated. On the other hand, if the darker copy button 58 is actuated as at 175, it is displayed in step 171 and the previously described steps are again scanned. If darker copy button 175 is not actuated, then actuation of keyboard 57 is checked at 176. If it is actuated, then the keyboard entry is displayed at 177 and the scan of steps 172-176 is reentered. If there is no keyboard entry, then the misfeed reset switch 61 is checked at 178. If it is actuated, the contents entered through keyboard 57 are stored at 179. In this instance, the numbers actuated on keyboard 57 will automatically be stored in a register called copy select (not shown), and if the misfeed reset button 61 is actuated, the contents of copy select are stored in another register for use in the CE mode. In any event, the scan 172-178 is repeated until either the start button or stop button are actuated for stepping the scan to the next group or element, respectively.

Furthermore, in FIG. 7, if the value in address 130 of FIG. 4 is greater than 849, the next value checked is 999 as at 180. If it is not 999, then step 128 is repeated. If it is 999, then a third scan group of steps is performed. First, at 181 start button is sensed for determining whether or not the next group should be displayed. The stop button is also checked at 182, the keyboard entry is checked at 183, and the misfeed reset button is checked at 184. If the misfeed reset button is actuated, all of the logs in one group are cleared as indicated by step 185. This action is also shown in FIG. 4 wherein AND circuit 190 responds to a decode 125 output corresponding to step 180 to enable the signal from misfeed reset switch 61 to actuate sequencer 191. Sequencer 191 has received the address signals from address register 151 and, depending upon the value as set forth in Tables I, II, or III, will scan through all addresses of each group as indicated by the addresses serially supplied over line 192 to CMOS 175. This action actuates a write or record operation in CMOS 175 with all zeros being supplied over lines 193 for erasing the log. Resetting the scan and indicated by step 130 or 180, is uses AND circuit 200 which receives an enabling signal over line 201 from decode 125. The keyboard entry is received over line 147. When both lines are active, register 202 receives the keyboard entry and then supplies the indicated value to limit circuit 203. Limit circuit 203 also receives an address signal from address register 151. If there is a match, AND circuit 204 is actuated for supplying a signal to address register 151 for resetting the latter to the lowest value in the group, such as 000, 860, and so forth.

Figure 8:
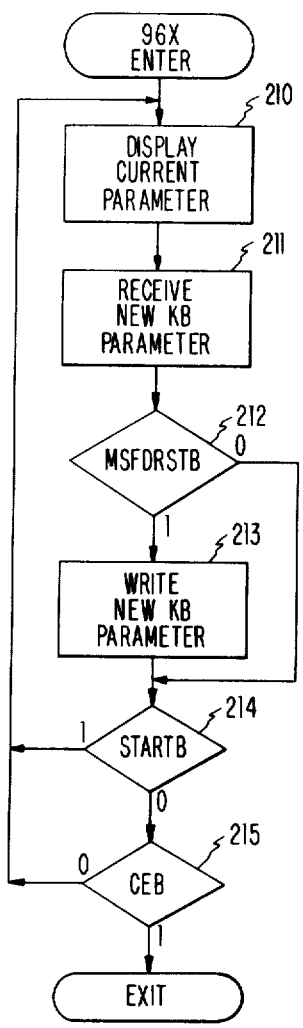
FIG. 8 is a flow chart illustrating interaction between a control panel and a nonvolatile store for adjusting machine operation parameters.

FIG. 8 illustrates the operation of decoder circuit 70 for inserting a new parameter within CMOS 175. At 210 the current parameter is displayed. A new keyboard parameter is received at 211 from keyboard 57. Actuation of the misfeed reset button 58 is checked at 212. If button 58 is actuated, then the new parameter is written into CMOS 175 at 213. If the misfeed reset button is not actuated, then the scan goes to start button check step 214. If the start button is actuated, then step 210 is reentered. If the start button is not actuated, the CE mode button is checked at 215. If it is not actuated, then step 210 is reentered. If CE button 62 is actuated, the CE mode is erased and no action is taken.

Figure 9:
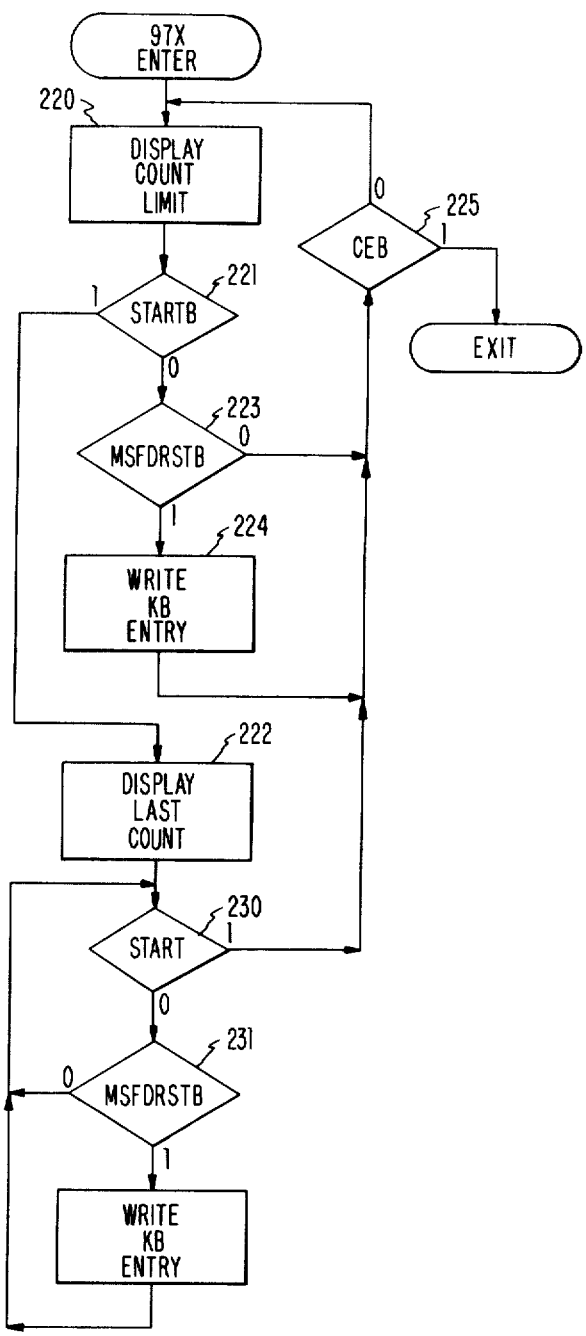
FIG. 9 is a flow chart illustrating interaction between a control panel and a nonvolatile store for controlling limits of operation on particular components within the semiautomatic machine.

FIG. 9 illustrates the procedure for checking the limits of counters within CMOS 175 which pertain to monitoring operation of the cleaner brush or the photoconductor advance. Two sets of registers are employed. One set of registers contains the limit the unit can be used before an adjustment is required, and the second register set contains the number of cycles performed by machine 10 since the last adjustment. The procedures are entered by entering a digit 97X, where X is one or two, into keyboard 57 and depressing the start button 59 for selecting the mode. The circuits 70 automatically display the count limit in thousands of cycles at 220. If the start button is again actuated as at 221, then the count value corresponding to the limit value is displayed at 221 in display 64. If the start button is not actuated, then the misfeed reset button 61 is checked at 223. If button 61 is actuated, then at step 224, the keyboard 57 entry made between entry of the mode 97X and actuation of the misfeed reset button is written into CMOS 175 as a new limit value. From steps 223, 224, the CE button 62 is checked at 225. If CE button 62 is actuated, the CE mode is exited as previously described; if not, the count limit is continued to be displayed at 220. In this case, it is the new count limit if the misfeed reset button 58 was actuated; otherwise it remains the previous count limit.

The count values displayed at 222 also cause the procedure to go to step 230 for checking the start button. If the start button is actuated, then the count limit is again displayed until the start button is again actuated. If the start button is not actuated, then at 231, actuation of the misfeed reset button 61 is checked. The misfeed reset button 61 being actuated causes storage of the contents of keyboard 57 into the appropriate register of CMOS 175 at 232, thereby altering the count in CMOS 175 of the number of cycles performed in copy production machine 10 since the last advance of a photoconductor or cleaning brush. This procedure is useful by maintenance personnel to update the count value in CMOS 175 such that operation of the copy production machine should result in automatic advancement of either the cleaning brush or the photoconductor. The maintenance personnel can in this way verify the operation of those adjustment procedures as well as adjusting them to cure some intermittent image transfer problem in copy production machine 10.

Figure 10:
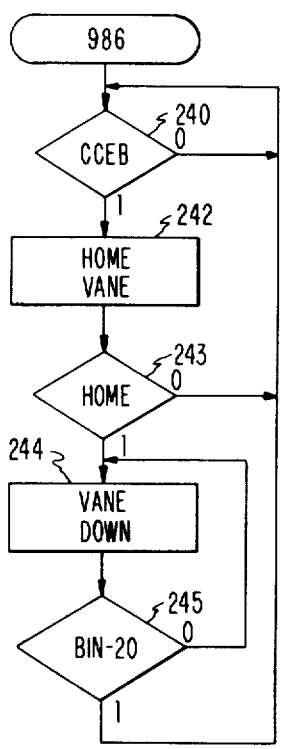
FIG. 10 is a flow chart illustrating interaction between a control panel and a nonvolatile store and diagnostic control of a portion of the semiautomatic machine.

FIG. 10 shows a procedure for exercising a copy distributor of the collator under control of the diagnostic modes. A keyboard 57 entry of 986 selects one of the collators for exercising. Once the collator exerciser mode is entered, actuation of the collator CEB 241 initially causes the vane to go to a home or upward position. This is indicated in FIG. 10 by steps 240 and 242. As soon as CCEB 241 is released, the vane stops. As soon as the vane reaches home as indicated by step 243, the direction of travel is automatically reversed and a continued actuation of CCEB 241 causes the vane to move away from home in a downward direction as indicated by step 244. When the vane has reached the bottom of the collator, i.e., bin 20 as at 245, the direction is again reversed and the vane is stepped toward home.

In addition to the above functions, a bin counter (not shown) is actuated and can be read out to indicate to the maintenance personnel the success of that type of control with respect to the collator operation. Other variations of such exercising tests are performed with copy production machine 10 using the above-described procedures.

Figure 11:
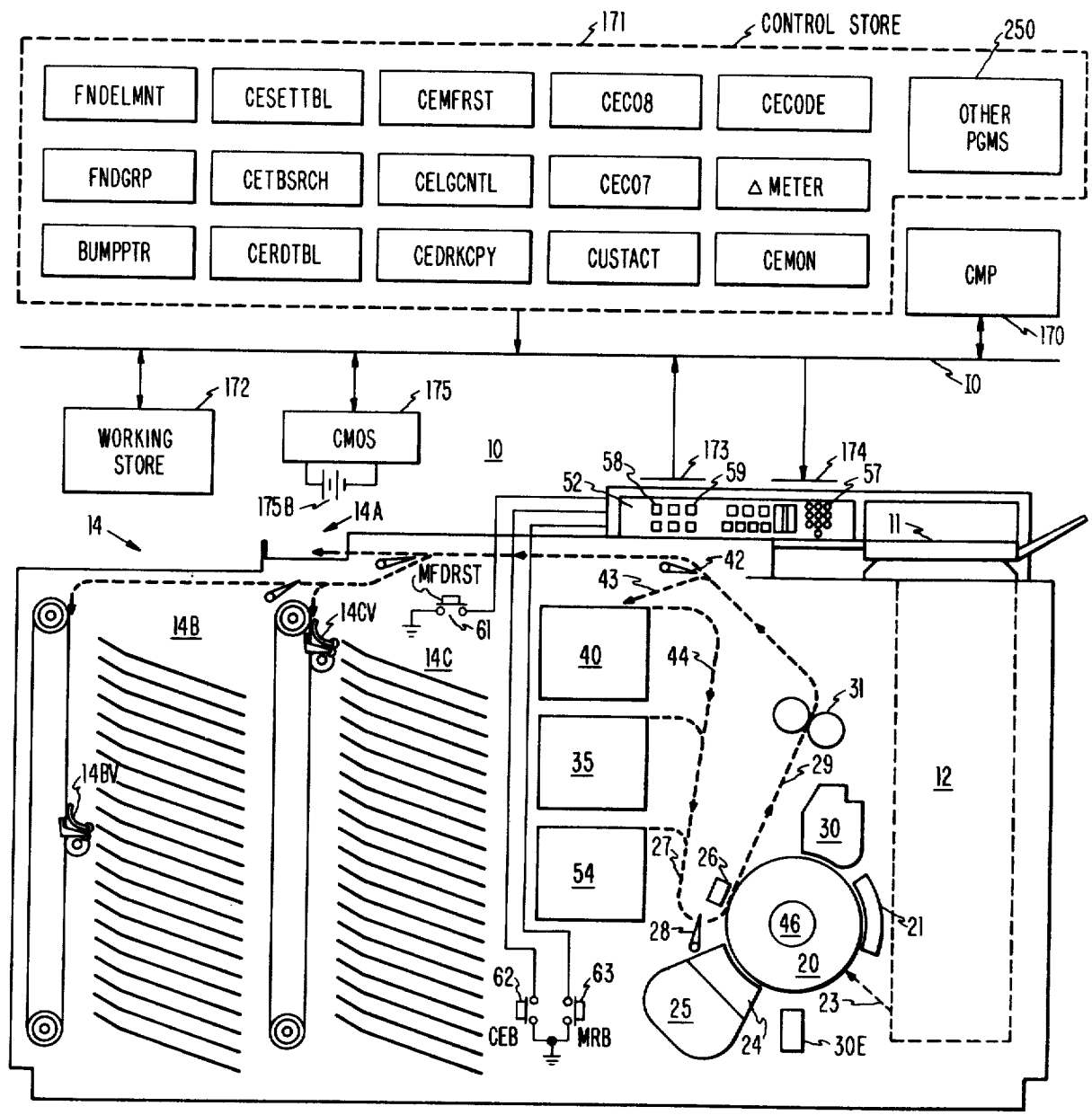
FIG. 11 is a block diagram of a computerized embodiment of the present invention.

FIG. 11 shows a preferred embodiment of the invention wherein all of the diagnostic procedures are executed under supervision of a control microprocessor facility. The copy production machine 10 is constructed as shown in FIG. 1 with the control being exercised over copy production machine 10 with a set of output registers 174 which receives control signals from a bidirectional data bus IO which in turn receives the control signals from copy microprocessor or CMP 170. CMOS 175 is also connected to IO for exchanging data signals with CMP 170. In addition, a volatile working store 172 of the semiconductive type (random access memory) is used in connection with control of copy production machine 10. A set of input registers 173 is connected to a plurality of sensing points (not shown) within copy production machine 10 as well as the inputs of control panel 52 which include, of course, keyboard 57. The heart of the procedural control by CMP 170 is in a ROS (read only store) control store 171 which includes a plurality of sets of program indicia to which CMP 170 responds for controlling copy production machine 10 in accordance with other programs 250. These other programs 250 control machine 10 in accordance with known process and machine control techniques. Accordingly, they are not described because they add nothing to an understanding of the present invention. Program indicia in control store 171 also include a CEMON program which is a supervisory type program for interpreting the setup commands for diagnostic procedures. Associated with CEMON in a CUSTACT program which provides limited access to CMOS 175. The log retrieval is embodied in programs CECO7 and CECO8. These programs enable CMP 170 to operate with related programs such as CEMFRST which enables CMP 170 to respond to actuation of misfeed reset button 61, CELGCNTL which is a log control program, CEDRKCPY which responds to the CE dark copy switch 58, a CESETTBL program which enables entries from keyboard 57 parameters into CMOS 175, CETBSRCH which enables looking for certain entries in CMOS 175, CERDTBL which reads the data from CMOS 175, FNDELMNT which is a find element program that finds the elements of the Tables I, II, or III, FNDGRP which finds the groups of Tables I, II, or III, and BUMPPTR which adjusts the memory pointer for incrementing the memory scan.

Addressing and operational control of FIG. 11 is in accordance with the Findlay application, supra. It is to be understood that any computer can be used in connection with practicing the present invention such as taught by Samir S. Husson in MICROPROGRAMMING PRINCIPLES AND PRACTICES, copyright 1970, Prentice Hall, Englewood Cliffs, NJ, Library of Congress Catalog Card No. 72-122612, as well as other literature readily available in textbook and periodical forms.

Figure 12:
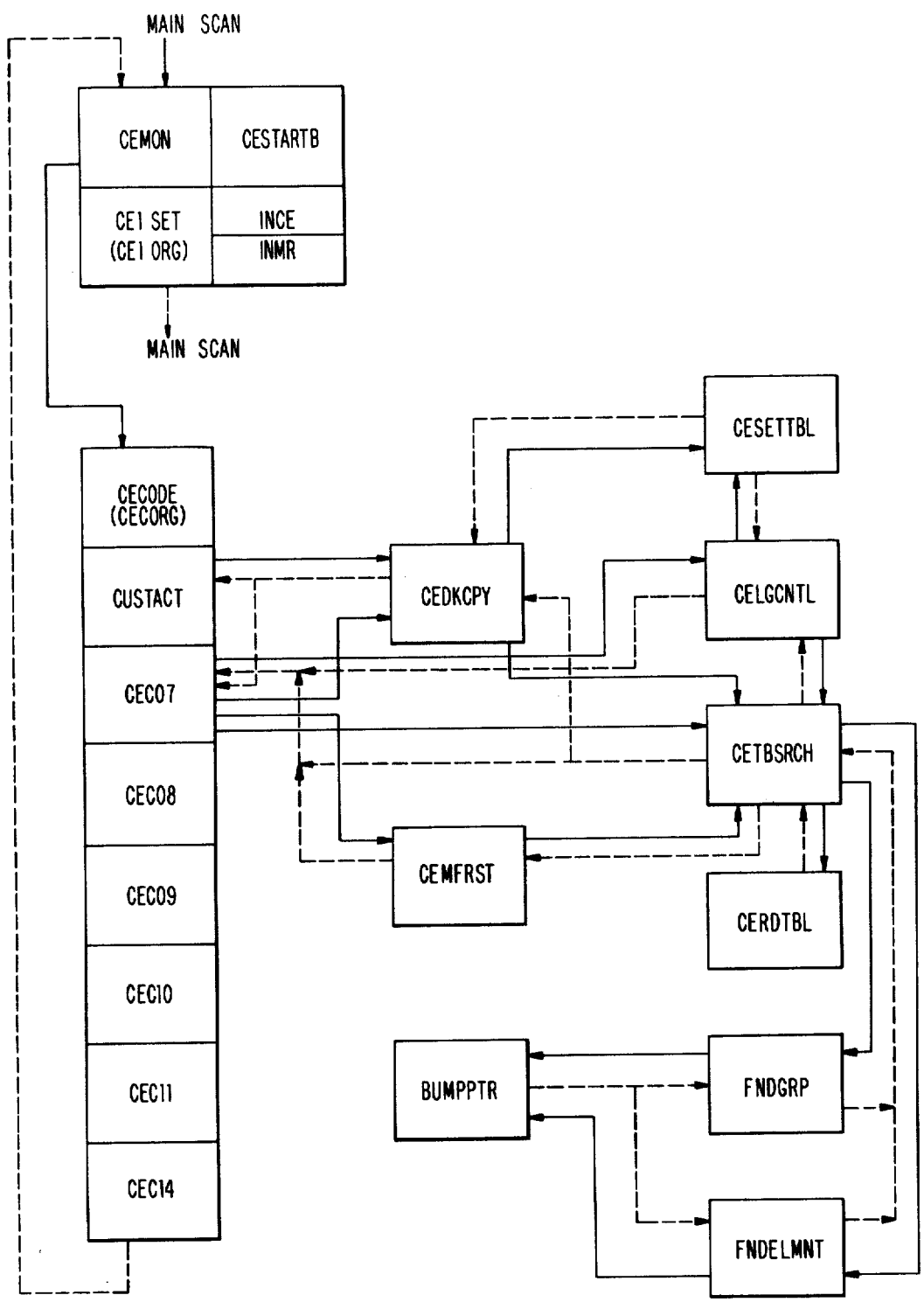
FIG. 12 is a flow chart showing various program segments usable with the FIG. 11 illustrated embodiment.

The procedures performed by the CMP 170 in the diagnostic mode are set forth in FIG. 12. A main scan, such as an idle scan of CMP 170, invokes CEMON when CEB 62 is actuated. In connection therewith, there are other programs CE1SET, CESTARTB, and subroutines which integrate the actuation of the CE button 62 and the momentary run button 63. Main scan is returned to from CE1SET.

As soon as the CE mode is reentered, CMP 170 has to determine what has to be done. This determination is achieved in CECODE, followed by the execution of the procedures represented by the program indicia of CUSTACT and CEC07 through CEC14, which then returns to CEMON. Only CUSTACT and CEC07 are intimately involved with the practice of the present invention. These two procedures have an operational relationship with other procedures through CMP 170, such as the previously mentioned CEDKCPY, CEMFRST and the other program indicia indicated in FIG. 12. The solid lines indicate program calls, i.e., actuation or call of CEDKCPY is from CUSTACT or from CEC07, for example. Returns from such calls are indicated by the dashed lines. Accordingly, the heirarchy of procedures in the diagnostic mode can be checked by tracing these lines in FIG. 12.

Figure 13:
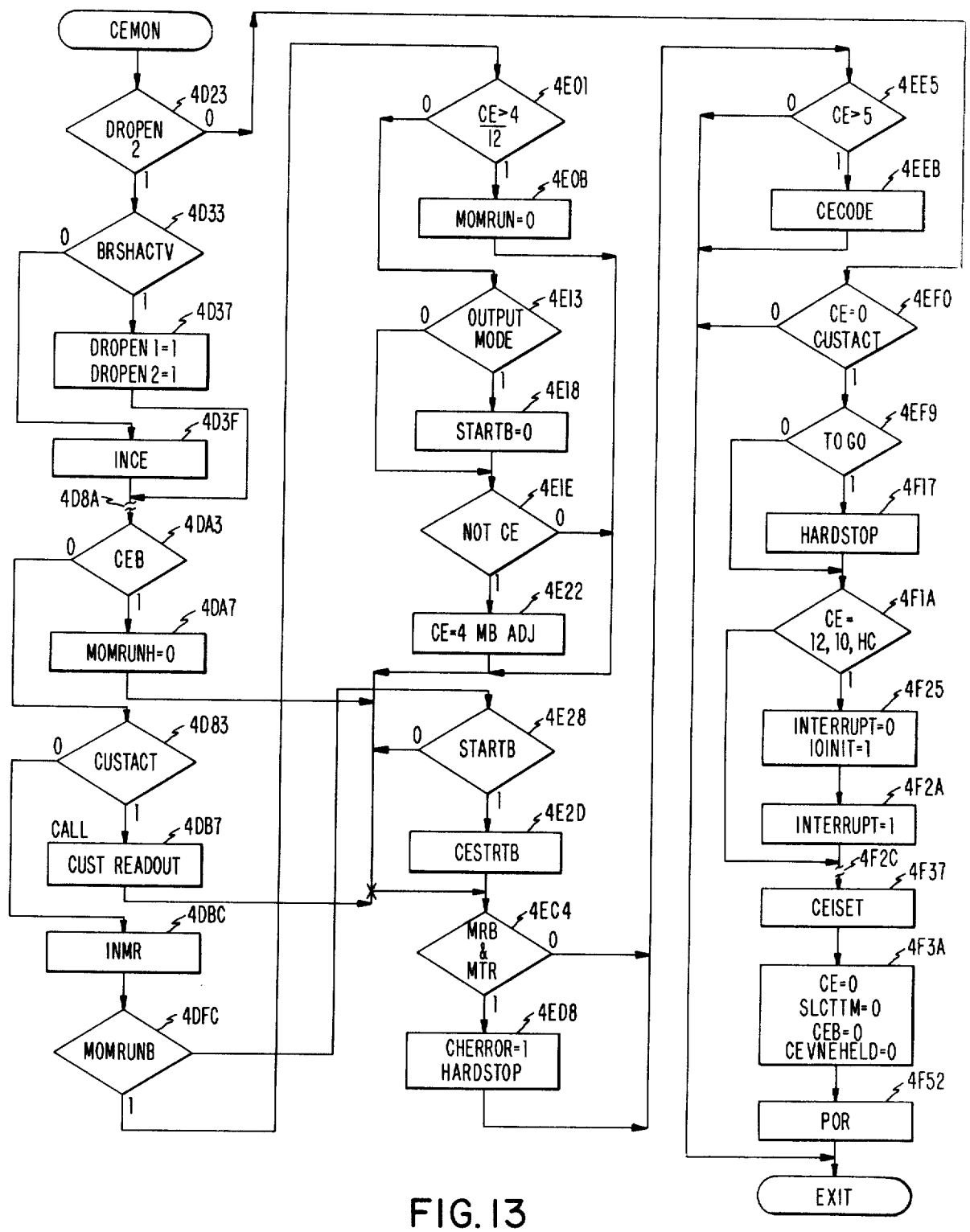
FIG. 13 is a flow chart illustrating a diagnostic monitoring routine at an instruction level.

The remaining description pertains to the details of the procedures of the present invention. FIG. 13 illustrates the detailed procedures of CEMON.

CEMON is shown in FIG. 13. These procedures first check at 4D23 to determine whether the doors to copy production machine 10 are open. Such doors, not shown, actuate interlock switches (not shown) for indicating whether or not the doors are open. If the doors are open, then the operation of copy production machine 10 is usually inhibited and it is interpreted by computer control 170, 171, 172, 173, 174, 175 that either the CE mode or some other procedure outside of normal copy production is to be employed. If the doors are closed, then copy microprocessor 170 proceeds immediately to step 4EF0, later described. With the doors open, copy microprocessor 170 checks at 4D33 to determine whether a cleaning brush within cleaning station 30 is being advanced toward photoconductor drum 20. Such advance is suitably described in U.S. Pat. No. 3,989,372 to Ron Davidge et al. If the brush is being advanced, then the door open flags DROPEN1 and DROPEN2 are both set. These bits are addressable bits within working store 172 (FIG. 11) and not shown for simplifying the drawing. If the brush is being advanced, the advance must be completed before further machine 10 action is permitted. The maintenance person signifies completion.

If the cleaning brush of station 30 is not being advanced, then the CE button 62 actuation is checked by a digital integration procedure INCE at 4D3F. Some other steps not pertinent to the present invention are performed at 4D8A. The integration of the CE button 62 at 4D3F will result in setting a bit flag to "1" in a bit position of working store 172 indicating successful integration of the CE switch 62. This flag is checked at 4DA3. If CE switch 62 was actuated, then a second flag in working store 172 STARTB is reset as well as a MOMRUN flag which corresponds to momentary run switch 63. From 4DA7, copy microprocessor 170 goes to 4EC4 as later described. If the CE switch 62 was not actuated, then at 4DB3 copy microprocessor 170 checks to determine whether CUSTACT is active, i.e., nonmaintenance personnel are operating with machine 10 for performing predetermined functions. If so, then at 4DB7, CECORG is called and executed as later described. If CUSTACT is zero, then the momentary run switch 63 actuation is checked by digital integration at 4DBC. Such integration is a program which enables CMP 170 to measure time of contact closure to define an actuation. The success of such integration is checked at 4DFC by checking flag MOMRUNB which, when set to the active condition, signifies that switch 63 had been actuated. If MRB 63 was not actuated, then the start button is checked at 4E28. The operation of the start button 59 is the same as described for FIG. 1. If it was actuated, then a flag CESTRTB is set at 4E2D. Such flag is a bit position in working store 172.

On the other hand, if MOMRUNB equals one, then copy microprocessor 170 at 4E01 checks what value is inserted into working store 172 via keyboard 57. Such indication would include checking whether a CE mode enumerated greater than four is active, i.e., as indicated in steps 210, etc. in ROS 171, and that CEC12, the output mode as described with respect to circuit 137, has not been selected. The CE modes are enumerated from 1-N, each mode relating to a different maintenance function. A CE mode of zero indicates normal copy production. If both those conditions are met, then MOMRUN is set to a zero at 4E0B; otherwise, the output mode of CEC11 is checked at 4E13. If the CE mode is the output mode, then the STARTA and STARTB flags are reset at 4E18. Otherwise, copy microprocessor 170 goes directly to step 4E1E to check whether the CE mode is active. With CE equal to zero it is not the CE mode and the step at 4EC4, later described, is performed. Otherwise, at 4E22 copy microprocessor sets the CE mode indicator to four which is a reference number useful in the maintenance mode and not pertinent to the present invention.

At 4EC4, copy microprocessor 170 checks whether copy production machine 10 is in a go state (enable to be started) and that the momentary run button 63 has not been actuated. If these two conditions are satisfied, copy production machine 10 must be stopped immediately at step 4ED8 as indicated by "HARDSTOP" and an error condition flag is set in working store 172. If the conditions are not met, then copy microprocessor 170 goes directly to 4EE5 to check whether the CE mode selected via keyboard 57 is greater than five. It it is, then CECORG is called and executed as later described. If not, the procedure is exited.

At step 4D23, if the doors are open, then at 4EF0, the copy microprocessor 170 checks whether the CE mode is inactive (CE=0) or CUSTACT is active. If either is so, then at 4EF9 copy microprocessor 170 checks whether copy production machine 10 is to "go" or is in a hand crank mode. For either, the error flag referred to above and the hard stop of copy production machine 10 is executed at 4F17. Machine 10 should not be operating when the doors are open, hence the hard stop. Then at 4F1A, the CE mode's output corresponding to circuits 70, a lamp test mode (not described) or a hand crank mode is active. If any of these are active, then all of the output registers 174 are initialized to a reference state, preferably all zeros, at step 4F25. Finally, the last procedures of FIG. 13 are at 4F2C wherein the power relay number two is deactivated for protection of the maintenance personnel, initializing flags for CE1 mode, i.e., the first actuation of CE switch 62 are set. The CE mode is set to zero, i.e., the numerical input to keyboard 57 has not yet been interpreted by copy microprocessor 170 and SLCTTM is set to zero. This latter flag in working store 172 causes copy microprocessor 170 to ignore copy parameter selections made via control panel 52. The vane held flag (preventing collator vane from moving) is reset for enabling copy microprocessor 170 to actuate the collator vanes 14BV and 14CB to move in collators 14B and 14C. Finally, a power on reset procedure POR2 is then executed at 4F52. That procedure initializes copy production machine 10 under control of copy microprocessor 170 and is not pertinent to the practice of the present invention. It should be noted that steps 4EF0 through 4F52 are executed only if the doors are closed as detectd by copy microprocessor 170 at 4D23.

Figure 14:
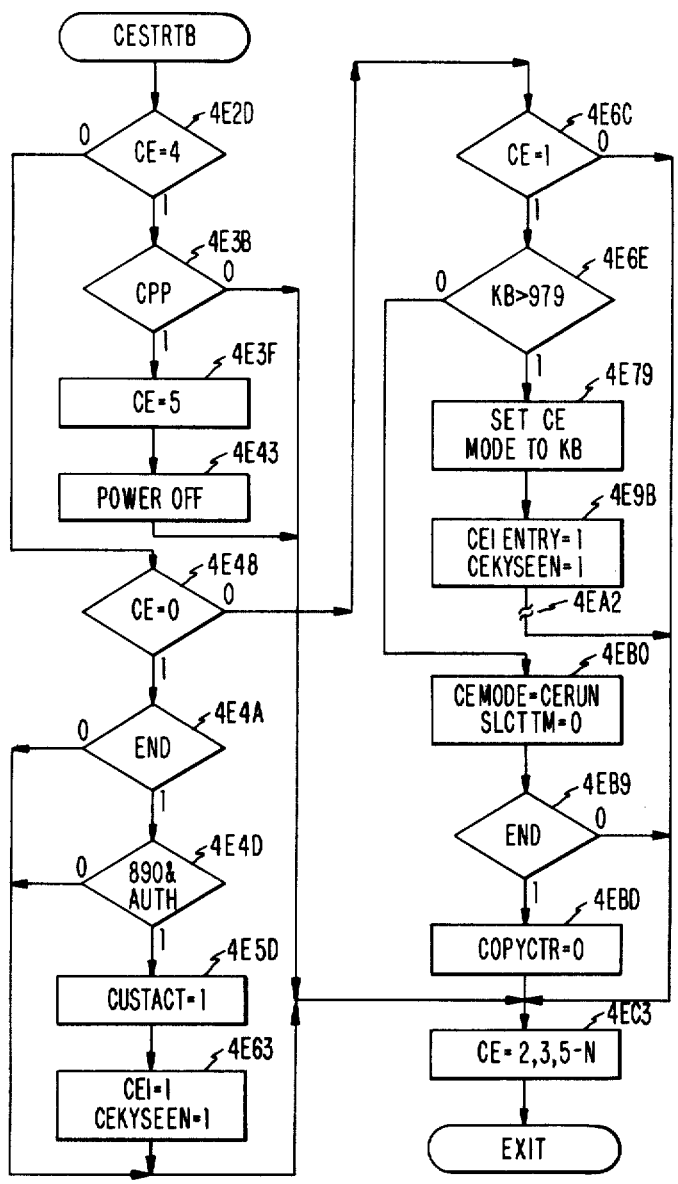
FIG. 14 is an instruction level flow chart showing action of a programmed processor for analyzing a control panel input from a start button.

In FIG. 14, the response of CMP 170 to the actuation of the start button 59 is shown in detail. AT 4E2D, the value of the CE mode is checked. If it is not 4, then it is checked at 4E48 for "0", as later described. If the CE mode is four, then at 4E3B whether a check paper path (CPP) condition exists is checked. If not, then at 4EC3 the value of the CE mode is set to one of 2, 3, or 5-N and the procedure terminated. On the other hand, if it is CPP at 4E3B, the CE mode is set equal to five, i.e., log retrieval. Power off is then commanded at 4E43.

If it was not CE mode=4 at 4E2D, then whether it is CE mode at all is checked at 4E48. If it is not CE mode (CE=0), then the END flag of working store 172 is checked at 4E4A. The END flag signifies a normal ending of copy production by machine 10. If it was a normal end, at 4E4D the nonmaintenance access to certain logs is verified. That is, the numeral 980 must be entered through KB 57 and an authorization bit (not shown) within CMOS 175 must have been set. If both of these conditions are met, CMP 170 at 4E5D sets CUSTACT for indicating a nonmaintenance access to CMOS 175 operation logs. The error logs are not normally accessible through this coding technique. Then at 4E63, the CE1 flag is set and the CEKYSEEN flag is also set. This procedure portion is terminated via 4EC3 from either 4E63, 4E4A or 4E4D.

If at 4E48, the CE mode was indicated (CE≠0), then at 4E6C whether the value of the CE mode is equal to one is checked. If it is a one, then at 4E6E the value of the keyboard 57 entry is checked whether it is greater than 979 (979 is a threshold value for selection). If the value is greater, then at 4E79, the CE mode is set to the value corresponding to a value entered into KB 57. Then at 4E9B, the flags CE1ENTRY and CEKYSEEN are set. Some nonpertinent code is executed at 4EA2 and the procedure terminated via 4EC3. On the other hand, if the keyboard 57 entry was less than 979, at 4EB0 the procedure calls for making the CE mode equal to the CE run mode, i.e., some diagnostic procedures are to be performed. SLCTTM is reset. Then the END flag is checked at 4EB9. If it is one, i.e., a normal end of copy production, then at 4EBD COPYCTR is reset to zeros.

Figure 15:
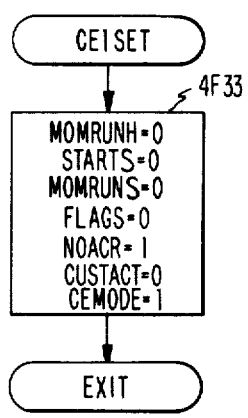
FIG. 15 is a simplified flow chart illustrating a mode selection during the maintenance operation of the machine.

FIG. 15 shows the CE1SET program. CE1SET procedures are relatively simple in that several flags in working store 172 are merely reset. This includes the momentary run indicator for switch 63, a start integrator for the start button 59, momentary run switch 63 integration routine flag, and many other flags are reset to zero. NOACR is set to one because no copy recovery will be permitted in the CE mode. CUSTACT is zero because actuation of the CE button 62 indicates to copy microprocessor 170 that maintenance personnel are working on the copy production machine 10 rather than a nonmaintenance operator. Finally, a flag CEMODE is set to one for indicating to copy microprocessor 170 in later described procedures that, in fact, copy production machine 10 is in the maintenance mode.

Figure 16:
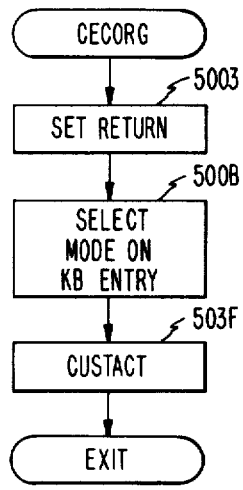
FIG. 16 is a flow chart which shows the response of a computerized version of the invention to a keyboard entry for selecting a mode of operation during maintenance.

FIG. 16 illustrates the procedures for CECORG. This set of procedures is executed by copy microprocessor 170 only on call from other procedures such that a return is set at 5003. The keyboard 57 entry is interpreted at 500B and the CE mode selected by the maintenance personnel via keyboard 57 is selected. CUSTACT is executed as indicated at 503F (the first step of CUSTACT) as detailed with respect to FIG. 17.

Figure 17:
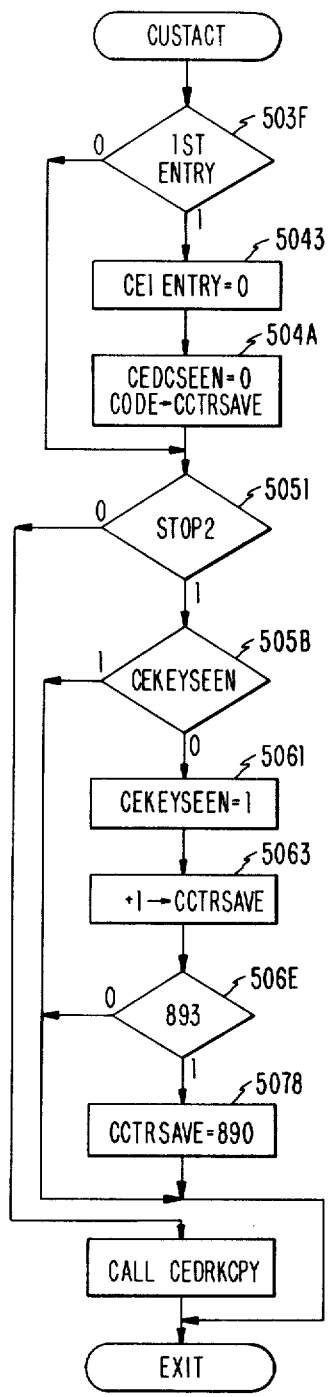
FIG. 17 is a flow chart of the computer program for enabling casual or operator access to predetermined portions of the nonvolatile store.

FIG. 17 shows the CUSTACT procedures which allow an operator access to a limited portion of CMOS 175. The first entry, i.e., the first actuation of CE switch 62, is checked at 503F. The first entry is represented by CEM latch 74 of FIG. 3 being toggled to the active condition. A bit condition within working store 172 stores this same information. If it is the first CE entry, then at 5043 the CE1ENTRY flag is reset to zero, and at 504A the CEDCSEEN flag is also reset to zero (CEDCSEEN=CEMODE, dark copy switch 58 was actuated and detected). The above two steps indicate that actuation of the CE button 62 was the second actuation, i.e., the first entry step at 503F indicated switch 62 had previously been actuated.

Then at 5051, a STOP2 flag of working store 172 is checked. If STOP2 is active, stop button 60 had been actuated and accepted by copy microprocessor 170. Then at 505B, the CEKEYSEEN flag is checked whether CE switch 62 had previously been logged as actuated. If not, then the flag is set at 5061. Furthermore, at 5063, one is added to the CCTRSAVE field of working store 172. This means that the actuation of the stop button 60 increments the count field in CCTRSAVE to advance the address of CMOS 175 within a group. Then at 506E, the address value 893 is checked whether it has been received from keyboard 57. If so, then CCTRSAVE is set to value 890 at 5078. That is, 890 is the lowest value used in CUSTACT. Each time the stop button 60 is actuated, the CCTRSAVE field value is incremented until 893 is reached, at which time it is reset to the initial condition 890. If the stop button had not been actuated at 5051, the CEDRKCPY routine is called for determining whether dark copy button 58 was actuated.

Figure 18:
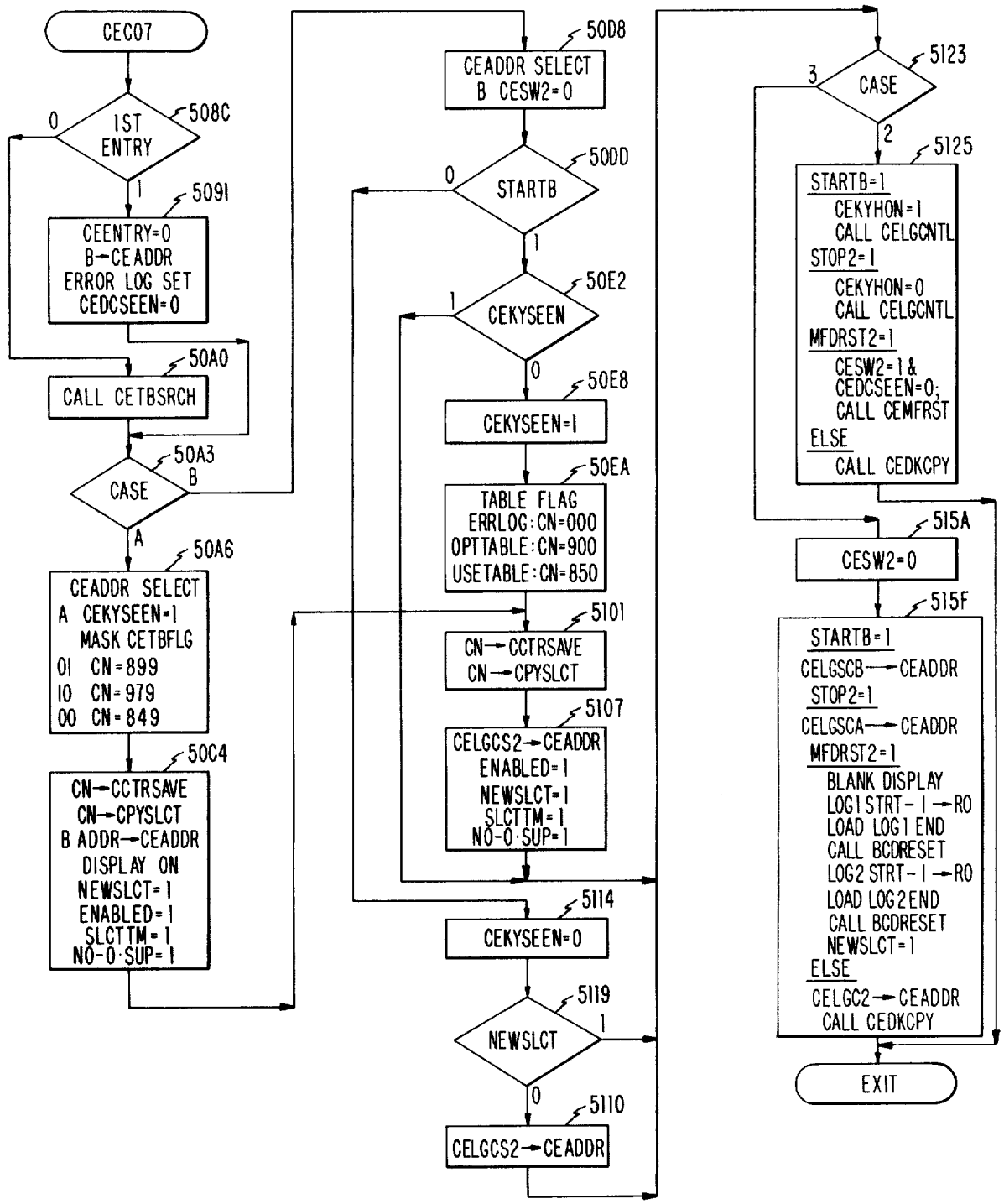
FIG. 18 is an instruction level flow chart relating to accessing the nonvolatile store for retrieving error and operations data.

FIG. 18 shows the log retrieval procedures as set forth in CEC07. At 508C, the first actuation of CEB 62 is checked. If a first entry flag had been set in working store 172, then it is the second actuation and 5091 is executed. CE entry flag is reset and the value of B is supplied to the CE address register (a register in working store 172), error log mode is set, and the flag CEDCSEEN is reset. Each flag is an addressable bit position within working store 172. On the other hand, if this is the first entry into the CEC07 since actuation of the CE button 62 and the start button 59 (first entry flag=0), then at 50A0 CMP 170 calls the later described procedure CETBSRCH for searching for an item to be displayed. At 50A3, case A or B is to be executed. In case A, at 50A6, CMP 170 does a CE address select. First CEKYSEEN is set. This means that the key actuation on panel 52 has been interpreted by CMP 170. The CE table flags are interpreted as follows. If the common number CN (number inputted via keyboard 57) is a maximum of 899, then the A bits are 01; if CN is 979 then the A bits are 10; or if the CN is 849, then the A bits are 00. It will be remembered from the earlier description that these correspond to the three log modes as previously described. At 50C4, the CN entered from keyboard 57 is transferred to two registers within working store 172 called CCTRSAVE and CPYSLCT. The address at location B of working store 172 is then supplied to the CE address register. Display 64 is turned on and the following flags are set: NEWSLCT is set to indicate that a new selection has just been honored; ENABLED which means the display 64 is enabled; SLCTTM which indicates CMP 170 will honor the next actuation of a button or switch from panel 52; and NO-O.SUP which suppresses normal copy production operation. From case A, the step 5101 is executed as later described.

Case B causes CMP 170 at 50D8 to do a CE address selection with CESW2 equal to zero. CESW2 is a flag for controlling the operation in the diagnostic mode as will become apparent. The start button is sensed at 50DD. If STARTB=1, then the CEKYSEEN bit is checked at 50E2. If it is on, then CMP 170 performs step 5123 as later described. If CEKYSEEN is off, it is set to the active condition at 50E8. Following step 50EA, table flags are set for the error log. The CN is all zeros. For the operations table, CN is 900, and for the usage table CN is 850. Note these values compares with the values described earlier with respect to the earlier embodiment.

CMP 170 at 5101 transfers the appropriate CN as selected by keyboard 57 to CCTRSAVE and CPYSLCT. Then at 5107, an address corresponding to procedures CELGCS2 is sent to the CE address register in working store 172. The ENABLED NEWSLCT, SLCTTM and NO-O.SUP flags are set as described earlier with respect to 50C4. Then CMP 170 goes to 5123.

If the start button 59 had not been actuated, the CEKYSEEN flag was reset at 5114. Following this reset operation, the NEWSLCT flag is checked at 5119. If a new selection had been honored, then CMP 170 goes directly to 5123. On the other hand, if it is not a new selection in this pass through the procedures, then the address of CELGCS2 goes at 5110 to the CE address register within working store 172.

At 5123, CMP 170 checks for procedures case 2 or 3. Procedures case 2 calls for step 5125 with the following functions performed. If the start button 59 is actuated, then the flag CEKYHON is set. This means the start button has been honored. A CELGCNTL procedure is then called as later described. If the stop button 60 has been actuated as indicated by STOP2=1 then CEKY-HON is reset which means the CE key can be honored. The same routine mentioned above is then called. If the misfeed reset button 61 has been actuated, then the flag CESW2 is set and CEDCSEEN is reset. These flags are bit positions within working store 172. If none of the panel 52 switches mentioned above have been actuated, then the CEDKCPY procedure (FIG. 19) is called for checking actuation of the dark copy button 58.

Case 3 causes CESW2 to be reset at 515A. At 515F several switches on panel 52 are checked. If start button 59 has been actuated, then the address for CELGSCB is sent to the CE address register. If the stop button 60 had been actuated, then CELGSCA is sent to the CE address register. These two address values will be used later as will become apparent. If the misfeed reset button 61 had been actuated, then display 64 is blanked and the presently addressed log of CMOS 175 is cleared and the NEWSLCT flag is set to one, indicating a new selection has been acknowledged. This new selection is a command to CMP 170 to clear out all of the logs in a group of logs as set forth in Tables I, II or III as addressed by keyboard 57. If all of the logs of codes 850–889 are to be cleared, number 988 is entered via keyboard 57, the start button 59 is actuated to enter the mode, and then the misfeed reset button 61 is actuated. CMP 170 responds to clear (zero) all these logs. If none of the above occur, then the CEDKCPY procedures are called as in case 2, but additionally CELGCS2 is sent to the CE address register of working store 172 for use later.

Figure 19:
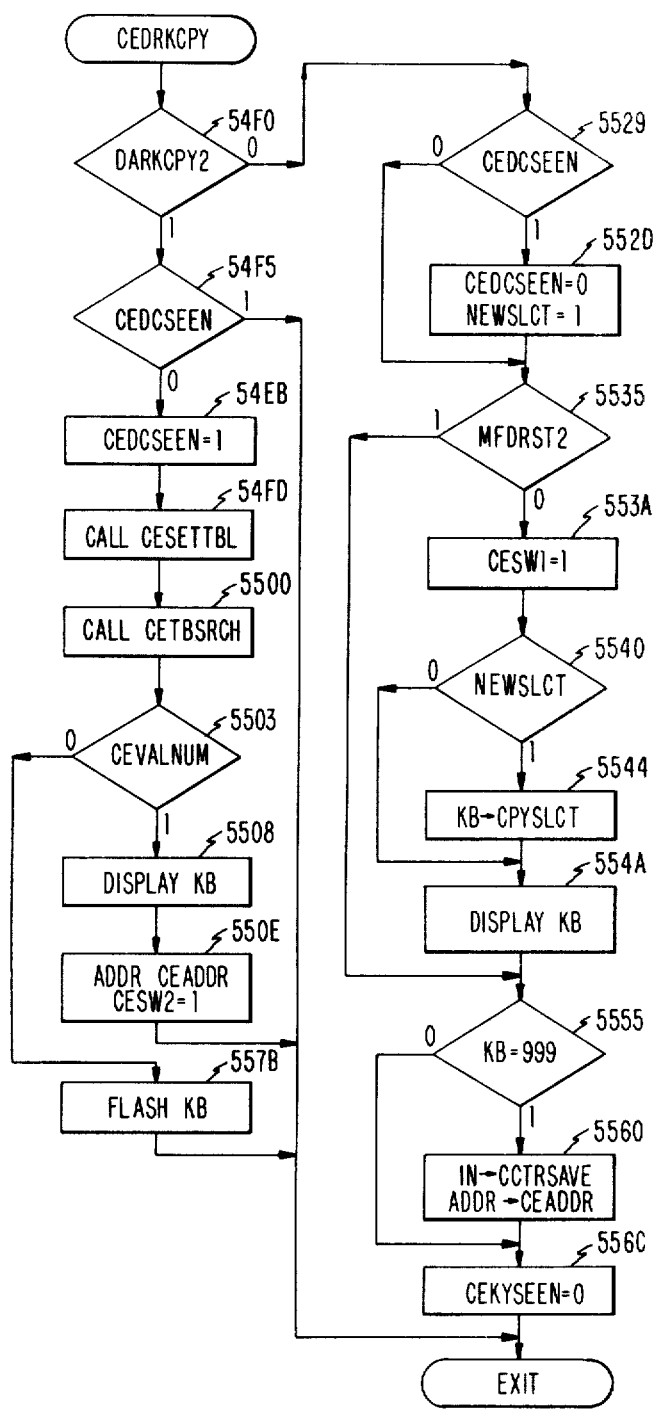
FIG. 19 is a computer instruction level flow chart illustrating certain internal functions for enabling access to the nonvolatile store.

From the previous description it was noted that the actuation of the dark copy selection button 58 plays an important role in the diagnostic procedures. FIG. 19 illustrates the response of CMP 170 to actuation of that switch. If button 58 was actuated, then the actuation of CE switch 62 is checked at 54F5. If both had been actuated, the procedure is terminated. If only the dark copy button 58 had been actuated, then at 54EB the flag CEDCSEEN is set. Then log related procedures are invoked at 54FD and 5500 as later detailed. Then at 5503, whether the diagnostic information is valid is checked. If it is valid and the keyboard 57 entry is also valid, the value entered into keyboard 57 is displayed in display 64 at 5508. Then at 550E, CESW2 is set while a second address field is set into the CE address register. If the number entered into the system by keyboard 57 is not valid, then the entered number is flashed at 557B.

If dark copy 58 had not been actuated, then at 5529, the CEDCSEEN flag is checked. If it is active, the flag is reset to zero at 5521 and a NEWSLCT flag is set indicating a new operator parameter selection is expected. Then at 5535, the actuation of misfeed reset switch 61 is checked. If it was not actuated, then the flag CESW1 is set at 553A. Also, NEWSLCT flag is checked at 5540. If it is set, then the new selection has been made via keyboard 57 and the value entered through keyboard 57 is transferred to the CPYSLCT register (not shown) in working store 172. The value is also displayed in display 64.

At 5555, the value of the keyboard 57 entry is checked to be 999 which is a reference or reset entry. If it is 999, then the inputted number is supplied to CCTRSAVE register of working store 172. In any event, at 556C CEKYSEEN flag is reset.

Figure 20:
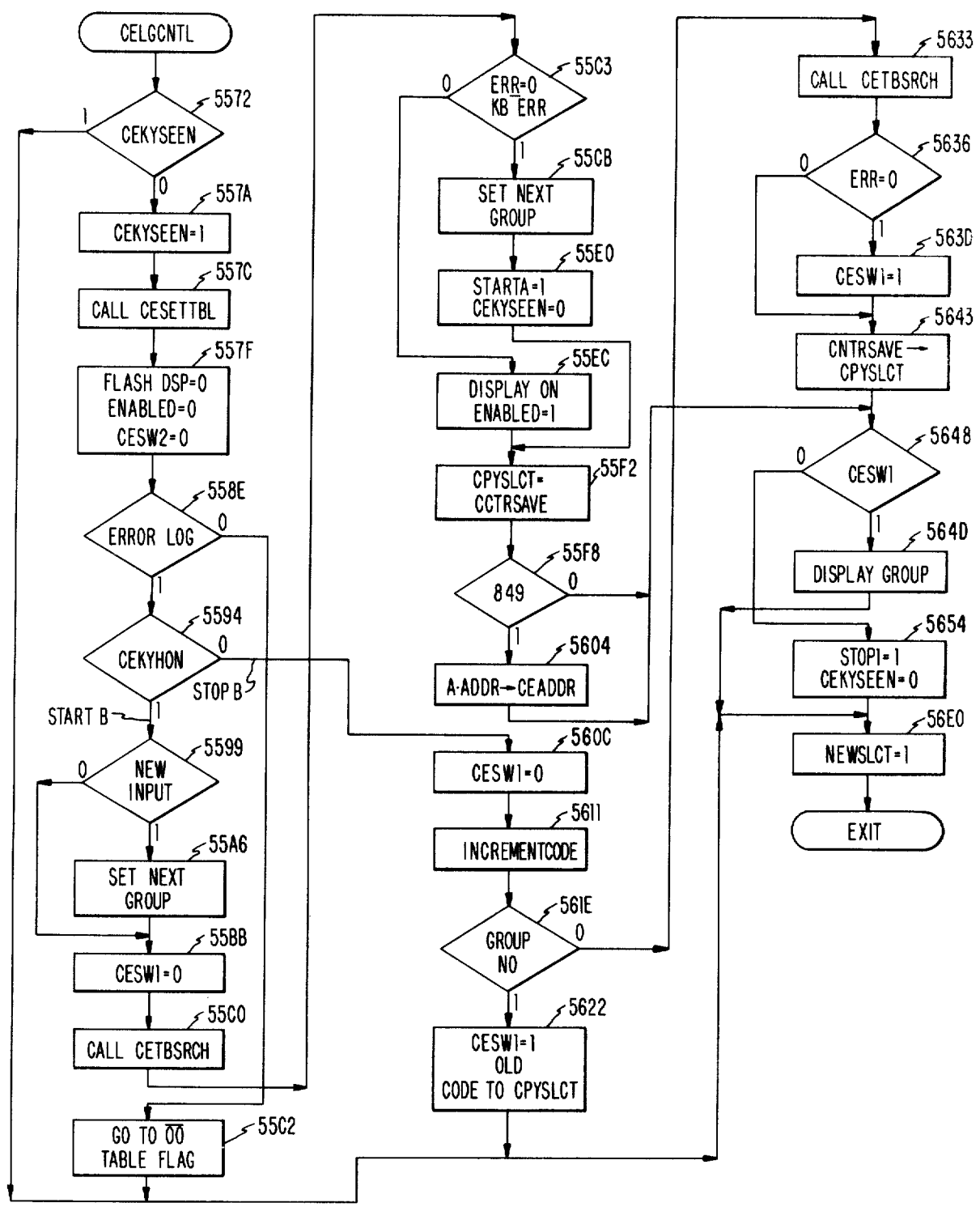
FIG. 20 is a computer instruction flow chart showing control programming related to the error logs and operation logs of the nonvolatile store.

FIG. 20 illustrates the procedures used in connection with the log control, i.e., fetching data from CMOS 175. At 5572, the CEKYSEEN flag is checked. If a key on panel 52 was actuated and had not been processed, then CEKYSEEN is set at 557A. Then at 557C, a later described procedure CESTTBL is called. A plurality of flags are reset at 557F including turning the display 64 off and resetting flag CESW2. At 558E, the procedure checks whether an error log is to be accessed. If it is an error log, then at 5594 the CEKYHON flag is checked. This flag indicates whether a key actuated was honored (detected). If the start button 59 was actuated, then at 5599 whether a new KB 57 input has been received is checked. If it is a new input, the next group is set at 55A6. This means the next group of elements, as set forth in Tables I, II and III. If there was no new input, then at 55BB, the procedures immediately reset CESW1. Then CETBSRCH is called at 55C0 for searching for the memory pointers to read the data stored in CMOS 175. If it is not an error log at 558E, then at 55C2 the table flag $\overline{00}$ is set to indicate the procedure is for operations data log accessing.

At 55C3, the value of the error is checked and whether a KB 57 error has occurred. If so, then the next group is set at 55CB; that is, in the error log scan, the display will remain disabled as long as no error conditions are found. Then at 55E0, a STARTA flag is set and the CEKYSEEN flag is reset for enabling analysis of the next actuation of a switch on panel 52. If there was an error detected, such as indicated at 55C3, then at 55EC the enable flag is set to the active condition for enabling display 64. At 55F2, CPYSLCT is made equal to CCTRSAVE. This action transfers the backup value of KB 57 entry to the register CPYSLCT in working store 172. Individual registers in store 172 are not illustrated for purposes of brevity, it being understood that such registers are addressable within working store 172 as is well known.

At 55F8, the code value 849 is checked (849 is the upper value for accessing CMOS 175 in the illustrated mode). If the value is 849, then at 5604 the base address for case A is transferred to a CEADDR address register in working store 172. Then at 5648, CESW1 is checked. If it is set, then at 564D the group number of CMOS 175 is displayed. Then, at 56E0, NEWSLCT is set.

At step 5594, if CEKYHON was zero, then at 560C the flag CESW1 in working store 172 is reset. The value of the address, i.e., as indicated by the code originally entered by KB 57, is incremented at 5611. At 561E, the incremented group number is checked as to whether a new group is being entered, i.e., the new groups as set forth in Tables I–III. If a new group is signified, at 5622 the flag CESW1 is set and the old address is set to CPYSLCT, all within working store 172. If a new group is not signified at 561E, then at 5633, CETBSRCH is called and will be later described. If the logged error is not zero at 5636, then CESW1 is set at 563D for enabling display of the code corresponding to the readout nonzero error. Then at 5643, the contents of CNTRSAVE are supplied to CPYSLCT.

At step 5648, if CESW1 was not set, then at 5654 STOP1 is set for enabling integration of the stop button 60 and the flag CEKYSEEN is reset for enabling acknowledgement of actuation of the stop button 60. It will be remembered that actuation of the stop button 60 steps the scan within a group to the next element of that group for locating a nonzero error code.

Figure 21:
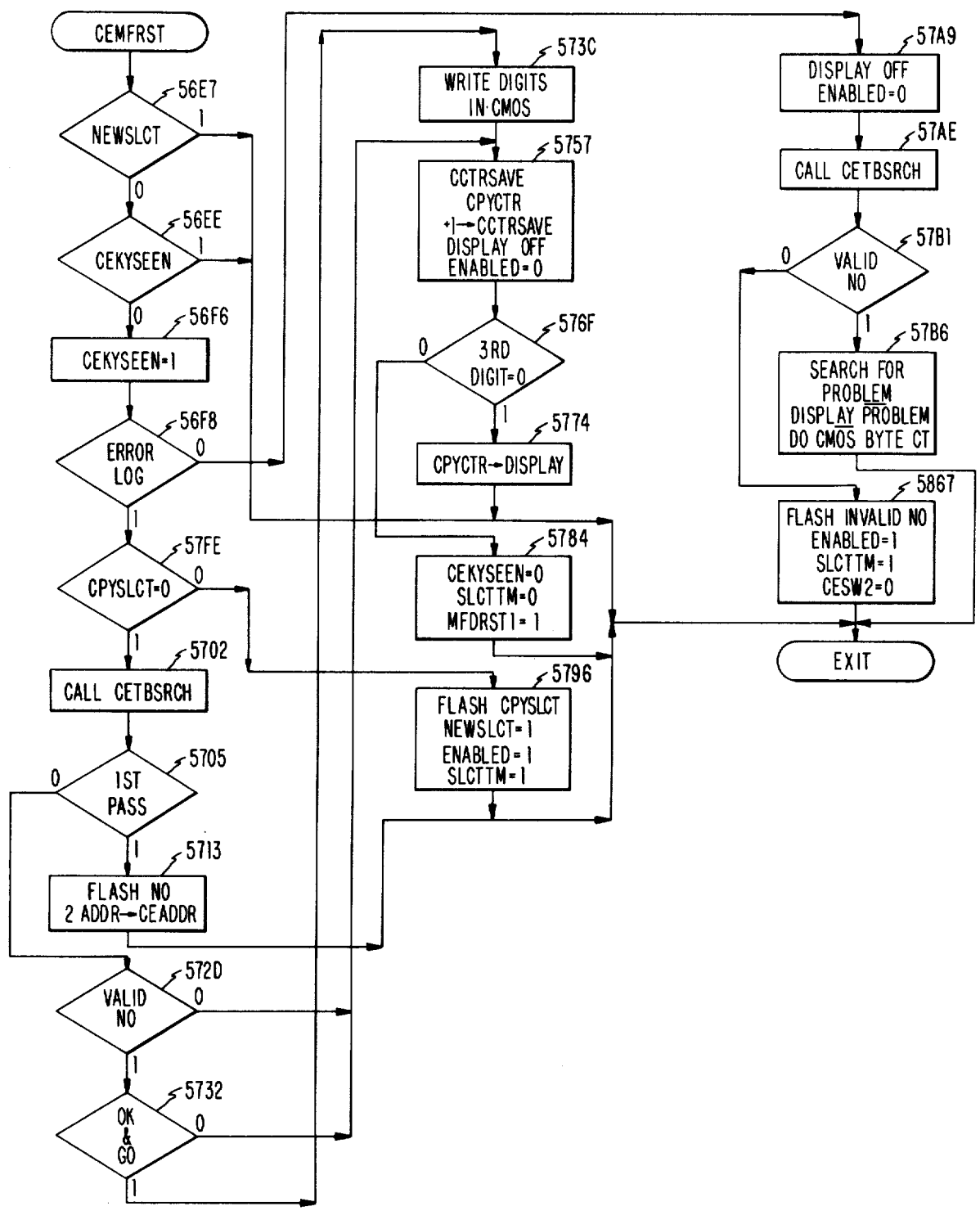
FIG. 21 is a computer instruction level flow chart showing the reaction of the program processor in the maintenance mode to the actuation of a misfeed reset button.

As previously described, the misfeed reset button 61 performs an important operator interaction vehicle for using the present invention in its preferred constructed embodiment. FIG. 21 illustrates the procedures performed in connection with actuation of the misfeed reset button 61. At step 56E7, the flag NEWSLCT of working store 172 is checked for activity, i.e., whether a new KB 57 input been supplied. If not, then the previously described flag CEKYSEEN is checked at 56EE. If it was not set, that flag is set at 56F6. Otherwise, from 56E7 and 56EE the procedures are terminated.

Whether an error log is being sensed is checked at 56F8. If not, the enabled flag is reset at 57A9 for turning display 64 off. Then CETBSRCH is called at 57AE; such procedure is described later. At 57B1, whether the KB 57 entry is valid is checked. If it is valid (a code number of Tables I, II or III has been entered) then at 57B6 the procedures search for the problem to display the problem, i.e., the code, and do a byte count of the entry being checked. This is done because the CMOS 175 entries are variable length, i.e., one entry may be a one byte register or two byte registers, three byte registers, up through six byte registers, for example. If the number is not valid, then at 5867, the KB 57 inputted number is flashed on display 64. The display 64 is enabled by setting the ENABLE flag while enabling the keyboard 57 by setting flag SLCTTM. Also, flag CESW2 is reset.

In step 56F8 in the procedure, if the procedure is for an error log, then the value of CPYSLCT is checked at 56FE. If it is not zero, then at 5796 the value in CPYSLCT is flashed on display 64, new selection is enabled, display is enabled, and the fact that a new selection was made is noted. If the value of CPYSLCT is zero, then CETBSRCH procedures (FIG. 24) are called at 5702. Then at 5705, whether it is the first path through this particular procedure is checked. If it is a first pass, the number is flashed at 5713 and a second address is sent to the CEADDR register of working store 172 and the procedure is terminated. If it is not the first pass at 5705, then the validity of the number is verified at 572D. If it is valid, then the conditions of the machine are checked at 5732 to determine whether a go condition is provided. If so, then the digits entered by KB 57 are written into CMOS 175 at step 573C at the address contained in CEADDR. If the situation is not ready to write into CMOS 175, then at 5757 the value contained in CCTRSAVE is supplied to CPYCTR, both registers being in working store 172. The value in CCTRSAVE is then incremented for getting the next log address in CMOS 175. Display 64 is turned off by resetting the ENABLED flag. At 576F, the value of the third digit of a three digit number in three byte registers of CMOS 175 is checked. If the third digit is zero, then at 5774 the value stored in CPYCTR is supplied to display 64 and the procedure terminated. If the third digit is nonzero at 576F, then at 5784 the CEKYSEEN and SLCTTM flags, previously described, are reset and MFDRST1 is set indicating that the misfeed reset button 61 is being actuated. Then the procedure is terminated.

Figures 22, 23:
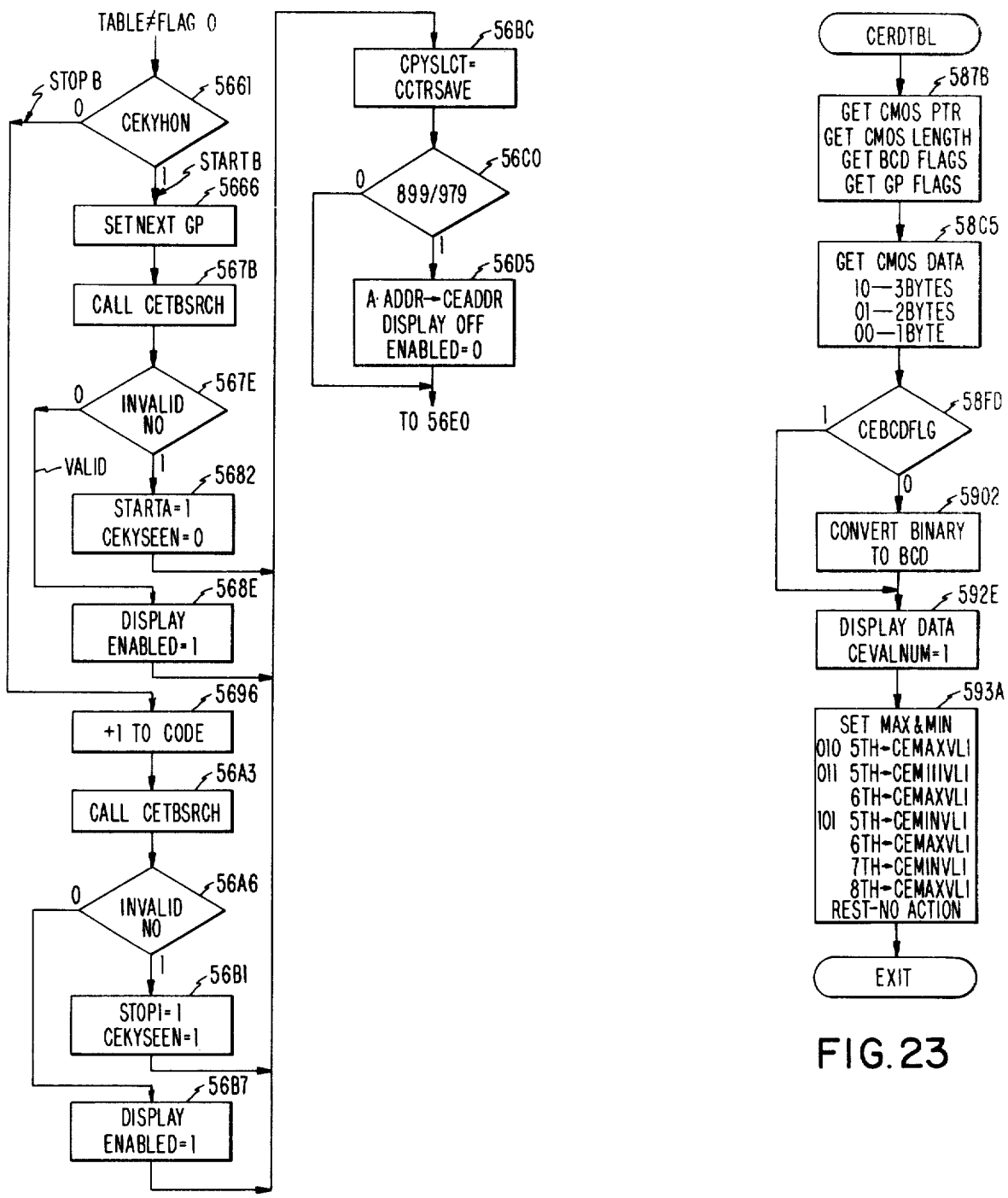
FIG. 22 is a computer instruction level flow chart showing operations of the illustrated machine in a diagnostic mode with respect to table flags associated with the nonvolatile store.
FIG. 23 is a computer instruction level flow chart illustrating the fetching of logged data from the nonvolatile store.

FIG. 22 illustrates a procedure for handling the table flags with respect to addressing registers in CMOS 175. It will be remembered in FIG. 20 that the table flag would indicate the category of accessing to CMOS 175. If the table flag is not zero, then at 5661 the flag CEKYHON of working store 172 is checked. If it is a one, then start button 59 was actuated and the next group is set at 5666, it being remembered that actuation of start button steps from one group to the next group while actuation of the stop button 60 actuates stepping between elements within a group. After the next group is set at 5666, the CETBSRCH procedure is called at 567B. The validity of the KB 57 number is checked at 567E. If it is not valid, then STARTA is set to one and the flag CEKYSEEN is reset at 5682. If the number is valid, then at 568E the display is enabled and the valid number is displayed without flashing in display 64. Following these steps, at 56BC the CPYSLCT register receives the numerical contents of CCTRSAVE. This action transfers the backup value to the operating value in registers within working store 172. Then at 56C0, the values 899 or 979 are checked; these are the upper limits of the log scans of CMOS 175 as previously described. If the limits are reached, then at step 56D5 the lower or base address code is transferred to the register CEADDR in working store 172 and the display 64 is disabled.

If CEKYHON=0 at 5661, the stop button 60 was actuated. At 5696, one is added to the present number which will designate the next CMOS 175 address. The address is obtained by CETBSRCH from the call at 56A3. Validity is checked at 56A6. If invalid, at 56B1 the indicated flags are set and step 56BC entered. Otherwise (number is invalid) the display 64 is enabled at 56B7 and step 56BC entered.

In FIG. 23, the procedures are set forth for reading numerical contents of addressed CMOS 175 registers. At 587B, the pointer to the register to be read (based on Tables I, II and II codes) is fetched along with the byte count, the group flags, and the binary coded decimal indicator flag. Then at 58C5, the actual data stored in CMOS 175 are read out in accordance with the flag 10 indicating three bytes, 01 indicating two bytes, and 00 indicating a single byte of data. Sequential reads of memory are well known and not further described for that reason. At 58FD, the flag CEBCDFLG is checked. If it is set, then the data just read out from CMOS 175 is already in binary coded decimal and therefore can be displayed directly on display 64 without binary-to-decimal conversion. If it is not in BCD, then the binary data is converted to BCD at 5902. The data is displayed in display 64 at 592E and the flag CEVALNUM is set for indicating display of a valid number in display 64. It should be noted that display 64 is three bytes long; however, if only two bytes are read, those two bytes are displayed in the lower two significant digit positions of display 64. Finally, at 593A, maximum and minimum values are set, all in connection with the length control of the data from CMOS 175. Since only three digits can be displayed at a time, action is required only if more than three digits are involved, i.e., five, six, seven or eight digits. This procedure provides for tracking which three digits are being displayed of the multidigit numbers. In general, for a six digit number, the most significant three digits are displayed first followed by the lower three significant digits.

Figures 24, 26:
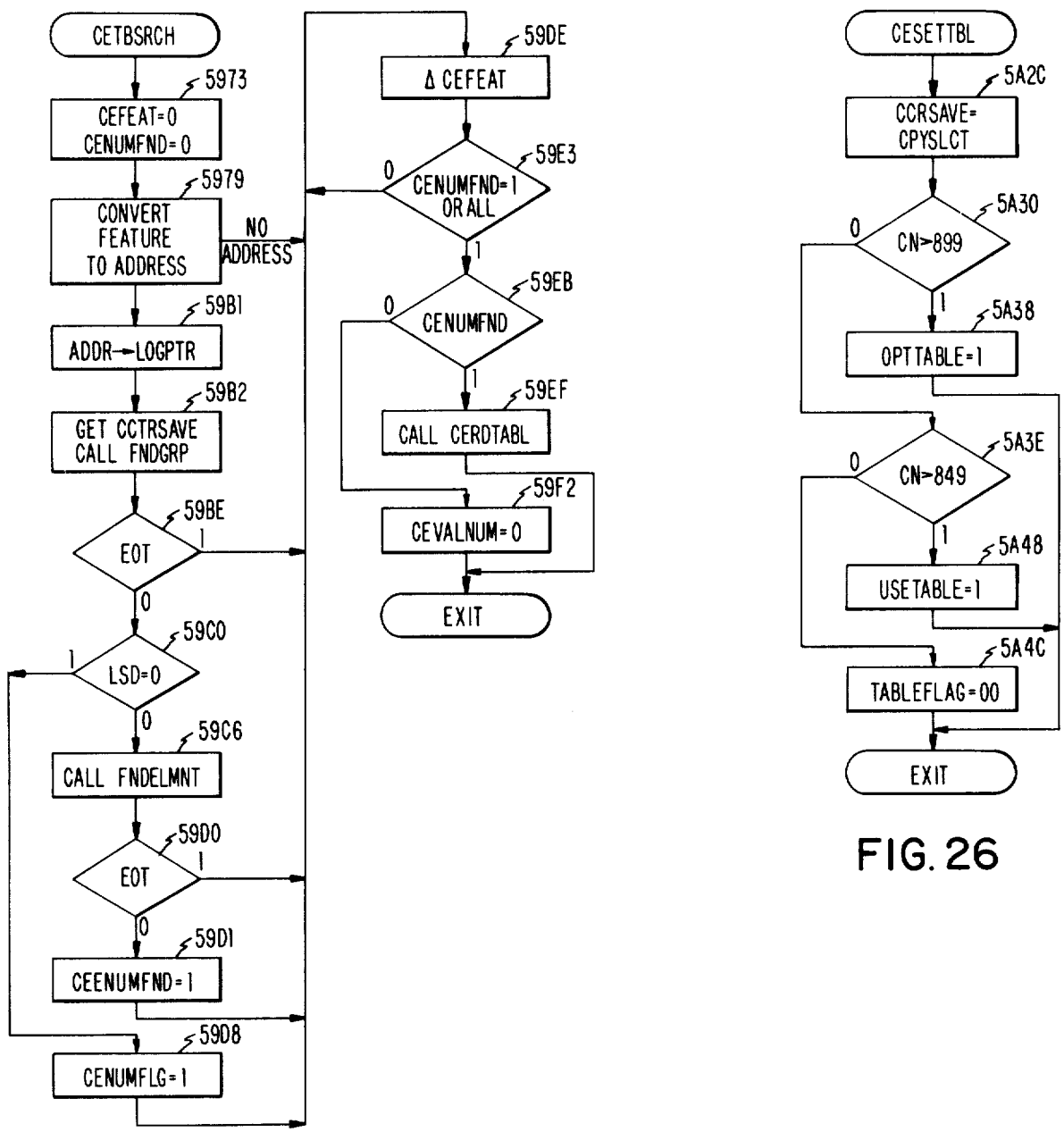
FIG. 24 is a computer instruction level flow chart illustrating searching tables stored in a nonvolatile store.
FIG. 26 is a computer instruction level flow chart illustrating recording data signals into the nonvolatile store during the maintenance mode.

In FIG. 24, the previously referred to procedure CETVSRCH is shown and described. This procedure searches the tables in working store 172 for accessing the desired register of CMOS 175 as indicated by the KB 57 entry of those values calculated based upon a KB 57 entry. At 5973, the flags CEFEAT and CENUMFND are reset. These flags respectively indicate that a feature is being changed by the maintenance personnel or that a proper number being sought was found, i.e., the search is just starting. At 5979, the KB 57 input or feature is converted to a CMOS 175 address. If it is not a used address (no feature), then at 59DE CE feature number is incremented. Then at 59E3, the flag CENUMFND equal one is checked as is whether all of the digits are set. If either condition is so, then whether it is CENUMFND is checked at 59EB. If so, then the CERDTABL procedure of FIG. 23 is invoked at 59EF.

If it is not the number found, then the valid number flag is reset at 59F2, i.e., no number is to be displayed at this time.

At step 5979, in converting the feature number to an address, if it is an assigned address, then at 59B1 the address is sent to a register called LOGPTR, i.e., the pointer to the log to be accessed in CMOS 175. Then at 59B2, the CCTRSAVE contents are read from working store 172 and a FNDGRP procedure is invoked. FNDGRP is a search procedure using known data processing techniques to convert the LOGPTR to an actual memory address, for example, address modification by substitution via table lookup. Then at 59BE, CMP 170 checks to determine if it is at the end of the table. If so, then 59DE is entered. If not, at 59C0 CMP 170 checks if the least significant digit is equal to zero (group number). If it is not zero (still within a group), then at 59C6 the next element of that group in the table is searched for. This is the same table lookup procedure as described for FNDGRP except it is to identify a memory address in CMOS 175 for an element within a group. Then, the end of table flag (EOT) is checked at 59D0. If it is not end of table, then the above-mentioned flag CENUMFMD is set at 59D1. That is, the memory address of CMOS 175 corresponding to the KB 57 entry or its incremented entry has been calculated and accessing a CMOS 175 register can ensue.

At step 59C0, if the least significant digit (LSD) of the KB 57 entered value is zero, i.e., a group code, then at 59D8, the flag CENUMFLG is set.

Figure 25:
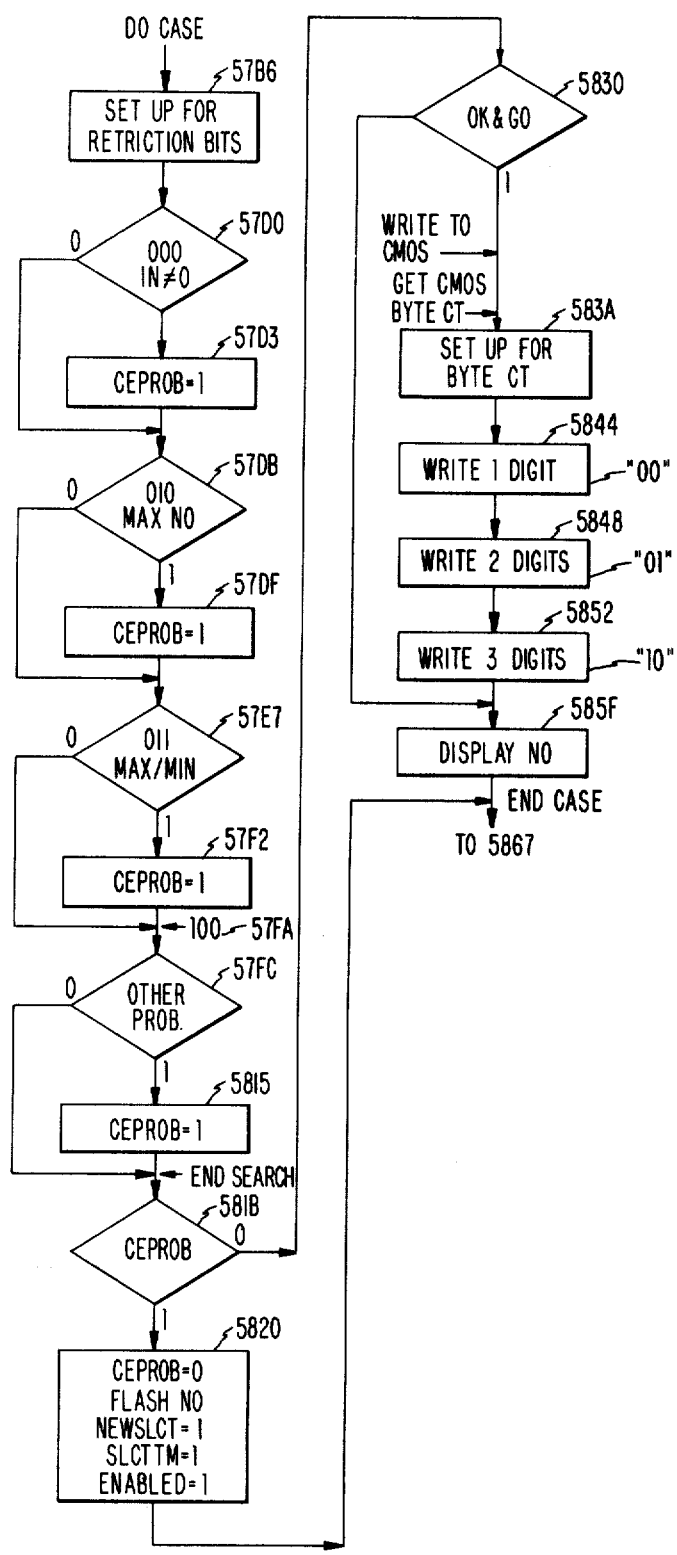
FIG. 25 is a computer flow chart illustrating control of the nonvolatile store with regard to field lengths of the logs and other entries in such nonvolatile store.

FIG. 25 is a procedure for defining the extent of searching in CMOS 175. The extent of searching is determined by a set of restriction bits which are three binary digits whose function will become apparent from a review of FIG. 25. At 57B6, CMP 170 sets up the procedures for restriction bits, i.e., clears registers and the like. If the restriction bits are all zeros at 57D0, i.e., the input is not zero, then at 57D3 the CE flag 1 is set, i.e., it is a CE function. Restriction bits 010 indicate a maximum number such as sensed at 57DB. Similarly, a maximum or a minimum is indicated by bits 011 at 57E7. Other types of problems, i.e., access to CMOS 175, can be checked at 57FC. The search is ended at 5815. Then whether a CE problem has been set up is checked at 581B. If so, the CEPROB flag is reset at 5820 and the number entered is flashed. The new select flag is set, selection is enabled, and the display 64 is enabled. If it is not a CEPROB, then at 5830 whether all authorizations have been checked and it is all right to write in CMOS is checked at 5830. If so, then CMOS byte count is obtained and set up at 583A. Then one, two, or three digits are written as indicated by 5844, 5848, 5852, i.e., this action is the actual data recording in CMOS 175. Note the binary flags 00, 01 and 10 correspond to the previously described field length indications for CMOS 175. If writing in CMOS 175 is not yet ready, then the number is displayed at 585F.

FIG. 26 shows procedure CESETTBL which enables access to CMOS 175 by enabling certain precedures to be set up preparatory for fetching and storing data signals. First, at 5A2C the value stored in CPYSLCT is transferred to the backup register CCTRSAVE, both registers being in working store 172. At 5A30, the number in CPYSLCT is checked to determine if it is greater than the upper limit 899. If it is, then a recycling of the scan must be performed as indicated by setting OPTTABLE (operations table) at 5A38. If the number is not greater than 899, then it is checked whether that number is greater than 849 at 5A3E. If so, USETABLE is set. This is the operations use table flag. Otherwise, the flag is set to 00 at 5A4C. From this, it is seen that FIG. 26 procedure describes accessing CMOS 175 in accordance with Tables I, II or III, Table I corresponding to 5A4C, Table II to 5A48, and Table III to 5A38.

It is to be appreciated that the above description is on a procedure-by-procedure basis. Because of the speed of CMP 170, each access to CMOS 175 includes several passes through the procedures, the actual execution depending on the flag values stored in working store 172.

Although the invention has been particularly shown and described with reference to preferred embodiments thereof, it will be understood by those skilled in the art that various changes in form and details may be made therein without departing from the spirit and scope of the invention.

What is claimed is:

1. A data logging device for accumulating operational information representing the functional performance of an associated machine, comprising in combination:

memory means for storing said information in locations therein, said information being separated into categories representing operations data, operational error data, and machine error data, each of said categories being divided into groups, each group having a unique identifier assigned thereto and a total representing the number of occurrences of a particular associated event, and each group being further divided into identifiable elements, each element having a total representing an item related to said group event;

means for successively scanning the contents of locations in said memory means, which locations store information representing the total number of occurrences of a particular event associated with a particular identified group;

means responsive to said scanning means for displaying a group identifier when its group total is greater than zero;

first operator-activated means for displaying when activated the contents of the location in said memory means containing the group total associated with the displayed group identifier;

second operator-activated means for selecting an element related to said displayed group identifier; and means responsive to said second operator-activated means for displaying the contents of the location in said memory means containing the total of said selected element.

2. The invention as claimed in claim 1 including:

third operator-activated means for continuing said scanning and wherein said second operator-activated means selects successive elements within a group when said second operator-activated means is successively activated.

* * * * *